(12) United States Patent
Wang et al.

(10) Patent No.: US 11,496,269 B2
(45) Date of Patent: *Nov. 8, 2022

(54) REFERENCE SIGNAL TRANSMISSION METHOD AND APPARATUS

(71) Applicant: Huawei Technologies Co., Ltd., Shenzhen (CN)

(72) Inventors: Jianguo Wang, Shanghai (CN); Yongxing Zhou, Beijing (CN)

( * ) Notice: Subject to any disclaimer, the term of this patent is extended or adjusted under 35 U.S.C. 154(b) by 58 days.

This patent is subject to a terminal disclaimer.

(21) Appl. No.: 17/096,703

(22) Filed: Nov. 12, 2020

(65) Prior Publication Data
US 2021/0067302 A1 Mar. 4, 2021

Related U.S. Application Data

(63) Continuation of application No. 16/418,131, filed on May 21, 2019, now Pat. No. 10,855,429, which is a
(Continued)

(51) Int. Cl.
*H04L 5/00* (2006.01)
*H04B 7/04* (2017.01)
(Continued)

(52) U.S. Cl.
CPC .............. *H04L 5/0053* (2013.01); *H04B 7/04* (2013.01); *H04B 7/0413* (2013.01);
(Continued)

(58) Field of Classification Search
None
See application file for complete search history.

(56) References Cited

U.S. PATENT DOCUMENTS

| | | | |
|---|---|---|---|
| 8,750,887 B2 * | 6/2014 | Chandrasekhar | H04L 5/0073 455/80 |
| 9,930,648 B2 | 3/2018 | Frenne et al. | |

(Continued)

FOREIGN PATENT DOCUMENTS

| | | |
|---|---|---|
| CN | 101207428 A | 6/2008 |
| CN | 101378595 A | 3/2009 |

(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 10), 3GPP TS 36.211 V10.7.0 (Feb. 2013), total 101 pages.
(Continued)

*Primary Examiner* — Phirin Sam
(74) *Attorney, Agent, or Firm* — Slater Matsil, LLP

(57) ABSTRACT

Embodiments disclose a reference signal transmission method and an apparatus. The method includes receiving reference signal resource configuration information sent by a base station, where the reference signal resource configuration information includes antenna port quantity information and a resource configuration index. The method also includes determining a reference signal configuration from a reference signal configuration set according to the antenna port quantity information and the resource configuration index. The method also includes obtaining, according to the determined reference signal configuration, positions of the resource elements (REs) that are used to send the reference signal on the antenna ports in the antenna port set, and receiving reference signals according to the positions of the REs.

24 Claims, 9 Drawing Sheets

Related U.S. Application Data continuation of application No. 15/785,881, filed on Oct. 17, 2017, now Pat. No. 10,333,677, which is a continuation of application No. 14/979,967, filed on Dec. 28, 2015, now Pat. No. 9,800,385, which is a continuation of application No. PCT/CN2013/078062, filed on Jun. 26, 2013.

(51) Int. Cl.
  *H04B 7/0413* (2017.01)
  *H04W 72/04* (2009.01)
(52) U.S. Cl.
  CPC ....... *H04L 5/0048* (2013.01); *H04W 72/0446* (2013.01); *H04L 5/0023* (2013.01)

(56) References Cited

U.S. PATENT DOCUMENTS

| | | | |
|---|---|---|---|
| 10,333,677 B2 * | 6/2019 | Wang | .............. H04L 5/0048 |
| 10,855,429 B2 * | 12/2020 | Wang | .............. H04B 7/04 |
| 2009/0011767 A1 | 1/2009 | Malladi et al. | |
| 2010/0062783 A1 | 3/2010 | Luo et al. | |
| 2010/0238877 A1 | 9/2010 | Nam et al. | |
| 2010/0279628 A1 | 11/2010 | Love et al. | |
| 2011/0158191 A1 | 6/2011 | Zhang et al. | |
| 2011/0170462 A1 | 7/2011 | Hao et al. | |
| 2012/0176939 A1 | 7/2012 | Qu et al. | |
| 2012/0182956 A1 | 7/2012 | Liu et al. | |
| 2012/0213113 A1 | 8/2012 | Zhao et al. | |
| 2013/0044727 A1 | 2/2013 | Nory et al. | |
| 2013/0223402 A1 | 8/2013 | Feng et al. | |
| 2013/0301434 A1 * | 11/2013 | Krishnamurthy | ..... H04L 5/0053 370/252 |
| 2013/0301448 A1 | 11/2013 | Sayana et al. | |
| 2013/0308555 A1 | 11/2013 | Ho | |
| 2013/0316719 A1 | 11/2013 | Mazzarese et al. | |
| 2014/0036796 A1 | 2/2014 | Etemad et al. | |
| 2014/0050159 A1 | 2/2014 | Frenne et al. | |
| 2014/0056265 A1 | 2/2014 | Koivisto et al. | |
| 2014/0056279 A1 | 2/2014 | Chen et al. | |
| 2014/0153515 A1 * | 6/2014 | Chun | ................ H04L 5/0094 370/329 |
| 2014/0169209 A1 | 6/2014 | Imamura et al. | |
| 2014/0169322 A1 | 6/2014 | Ouchi et al. | |
| 2014/0247775 A1 | 9/2014 | Frenne et al. | |
| 2014/0295909 A1 | 10/2014 | Ouchi et al. | |
| 2015/0036604 A1 | 2/2015 | Park et al. | |
| 2015/0055584 A1 | 2/2015 | Lee et al. | |
| 2015/0078328 A1 | 3/2015 | Tang | |
| 2015/0092722 A1 | 4/2015 | Zhang et al. | |
| 2015/0110033 A1 | 4/2015 | Yi et al. | |
| 2015/0131565 A1 | 5/2015 | Nakashima et al. | |
| 2015/0131603 A1 * | 5/2015 | Kim | ................ H04B 7/0626 370/330 |
| 2015/0155987 A1 | 6/2015 | Chung et al. | |
| 2015/0173064 A1 * | 6/2015 | Kim | ................ H04W 24/08 370/252 |
| 2015/0237523 A1 | 8/2015 | Chun et al. | |
| 2015/0289264 A1 | 10/2015 | Sandberg et al. | |
| 2018/0242172 A1 * | 8/2018 | Kim | ................ H04B 7/024 |

FOREIGN PATENT DOCUMENTS

| | | |
|---|---|---|
| CN | 102076076 A | 5/2011 |
| CN | 102239647 A | 11/2011 |
| CN | 102438312 A | 5/2012 |
| CN | 102624495 A | 8/2012 |
| WO | 2012100752 A1 | 8/2012 |
| WO | 2013035992 A1 | 3/2013 |

OTHER PUBLICATIONS

3rd Generation Partnership Project; Technical Specification Group Radio Access Network; Evolved Universal Terrestrial Radio Access (E-UTRA); Physical Channels and Modulation (Release 11), 3GPP TS 36.211 V11.3.0 (Jun. 2013), total 108 pages.

LG Electronics, et al., "Harmonized Proposal for CSI-RS Pattern," 3GPP TSG RAN WG1 Meeting #61b, R1-104263, Jun. 2x Jul. 2, 2010, Dresden, Germany, 4 pages.

* cited by examiner

REFERENCE SIGNAL TRANSMISSION METHOD AND APPARATUS

CROSS-REFERENCE TO RELATED APPLICATIONS

This application is a continuation of U.S. patent application Ser. No. 16/418,131, filed on May 21, 2019, which is a continuation of U.S. patent application Ser. No. 15/785,881, filed on Oct. 17, 2017, now U.S. Pat. No. 10,333,677, which is a continuation of U.S. patent application Ser. No. 14/979,967, filed on Dec. 28, 2015, now U.S. Pat. No. 9,800,385, which is a continuation of International Application No. PCT/CN2013/078062, filed on Jun. 26, 2013. All of the afore-mentioned patent applications are hereby incorporated by reference in their entireties.

TECHNICAL FIELD

The present invention relates to the field of communications technologies, and in particular, to a reference signal transmission method and an apparatus.

BACKGROUND

Generally, different types of reference signals are used in a communications system, where one type of reference signal is used for channel estimation, by which coherent demodulation is performed on a received signal including control information or data, and another type of reference signal is used for channel state or channel quality measurement, by which scheduling for user equipment (UE) is implemented. In a 3rd generation partnership project (3GPP) long term evolution (LTE) release 10 (R10) downlink system, a reference signal used for coherent demodulation is referred to as a demodulation reference signal (DMRS), and a reference signal used for channel state information measurement is referred to as a channel state information reference signal (CSI-RS). In addition, reference signals also include a cell-specific reference signal (CRS) inherited from an R8/R9 system, where the CRS is used for UE channel estimation, which implements demodulation of a physical downlink control channel (PDCCH) and other public channels.

In an LTE system, maximum quantities of antenna ports supported by the foregoing several types of reference signals are different. In LTE R10, the DMRS supports a maximum of eight antenna ports; in LTE R10, the CSI-RS supports a maximum of eight antenna ports, where a quantity of antenna ports may be 1, 2, 4, or 8; and in LTE R8 to R10, the CRS supports a maximum of four antenna ports, where a quantity of antenna ports may be 1, 2, or 4. In LTE R10, the DMRS supports a maximum of eight antenna ports, where a quantity of antenna ports may be 1 to 8. To improve spectral efficiency, the soon-to-be-launched LTE R12 standard has begun to consider introducing more antenna configurations, especially an antenna configuration of more than eight antenna ports based on an active antenna system (AAS). For example, a quantity of antenna ports may be 16, 32, or 64.

The prior art has at least the following problems: the prior-art CRS supports a maximum of four antenna ports, and direct expansion to support 16 antenna ports or more antenna ports may result in high overheads. The prior-art CSI-RS supports a maximum of eight antenna ports, and direct expansion in a PDSCH region to support 16 antenna ports or more antenna ports may result in interference to downlink data transmission of an existing system, causing performance degradation of a downlink system. If expansion is performed by using a neighboring resource block, correct CSI estimation cannot be performed by legacy UE. Therefore, no prior-art reference signal design solution can provide effective support for more antenna ports.

SUMMARY

A reference signal transmission method and an apparatus are provided, and can resolve a problem that prior-art reference signals do not support more than eight antenna ports, so as to improve efficiency of channel state information measurement and improve a system throughput.

A first aspect provides a reference signal transmission method. The method includes receiving reference signal resource configuration information sent by a base station, where the reference signal resource configuration information includes antenna port quantity information and a resource configuration index; determining a reference signal configuration from a reference signal configuration set according to the antenna port quantity information and the resource configuration index, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where an RE that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair. The method also includes obtaining, according to the determined reference signal configuration, positions of the resource elements (REs) that are used to send a reference signal on the antenna ports in the antenna port set; and receiving the reference signal according to the positions of the REs.

In a first possible implementation manner, the first RB pair and the second RB pair are separately located at different frequency domain positions in a same subframe or located in a same subband of different subframes.

With reference to the first aspect or the first possible implementation manner of the first aspect, in a second possible implementation manner, a resource element group used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A = \{REG_i | i=0, 1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs respectively; and each resource element group in the set A represents a set of position triplets (k', l', $n_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s$ mod 2 represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0, 1, \ldots, M-1\}$, and $i_1$, $i_2$, $j_1$ and $j_2$ meet at least one of the following relationships: $j_1=(i_1+n) \bmod M$, $j_2=(i_2+n) \bmod M$, and $j_1=i_2$, $j_2=i_1$, where n represents a shift whose value is an integer.

Optionally, when a cyclic prefix (CP) is a normal CP, the resource element group set A includes two or more of the following resource element groups:

$REG_0^{NCP} = \{(9,5,0),(9,6,0),(8,5,0),(8,6,0),(3,5,0),(3,6,0),(2,5,0),(2,6,0)\}$;

$REG_1^{NCP} = \{(11,2,1),(11,3,1),(10,2,1),(10,3,1),(5,2,1),(5,3,1),(4,2,1),(4,3,1)\}$;

$REG_2^{NCP} = \{(9,2,1),(9,3,1),(8,2,1),(8,3,1),(3,2,1),(3,3,1),(2,2,1),(2,3,1)\}$;

$REG_3^{NCP} = \{(7,2,1),(7,3,1),(6,2,1),(6,3,1),(1,2,1),(1,3,1),(0,2,1),(0,3,1)\}$; and $REG_4^{NCP} = \{(9,5,1),(9,6,1),(8,5,1),(8,6,1),(3,5,1),(3,6,1),(2,5,1),(2,6,1)\}$.

Optionally, when a cyclic prefix (CP) is a normal CP and a subframe type is LTE frame structure type 2 FS2, the resource element group set A includes two or more of the following resource element groups:

$REG_0^{NCP,FS2} = \{(11,1,1),(11,3,1),(10,1,1),(10,3,1),(5,1,1),(5,3,1),(4,1,1),(4,3,1)\}$.

$REG_1^{NCP,FS2} = \{(9,1,1),(9,3,1),(8,1,1),(8,3,1),(3,1,1),(3,3,1),(2,1,1),(2,3,1)\}$;

$REG_2^{NCP,FS2} = \{(7,1,1),(7,3,1),(6,1,1),(6,3,1),(1,1,1),(1,3,1),(0,1,1),(0,3,1)\}$; and Optionally, a resource element group pair $(REG_{i_1}, REG_{i_2})$ used by the two antenna port subsets in the antenna port set corresponding to the first reference signal configuration is $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_1^{ECP,FS2})$, $(REG_1^{ECP,FS2}, REG_2^{ECP,FS2})$, or $(REG_2^{ECP,FS2}, REG_0^{ECP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_3^{NCP})$, $(REG_2^{NCP}, REG_1^{NCP})$, $(REG_3^{NCP}, REG_2^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_2^{NCP,FS2})$, $(REG_1^{NCP,FS2}, REG_0^{NCP,FS2})$, or $(REG_2^{NCP,FS2}, REG_1^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_2^{NCP})$, $(REG_2^{NCP}, REG_1^{NCP})$, $(REG_3^{NCP}, REG_4^{NCP})$, $(REG_3^{NCP}, REG_1^{NCP})$, or $(REG_4^{NCP}, REG_0^{NCP})$.

Optionally, when a cyclic prefix (CP) is an extended CP, the resource element group set A includes two or more of the following resource element groups:

$REG_0^{ECP} = \{(11,4,0),(11,5,0),(8,4,0),(8,5,0),(5,4,0),(5,5,0),(2,4,0),(2,5,0)\}$ $REG_1^{ECP} = \{(9,4,0),(9,5,0),(6,4,0),(6,5,0),(3,4,0),(3,5,0),(0,4,0),(0,5,0)\}$;

$REG_2^{ECP} = \{(10,4,1),(10,5,1),(7,4,1),(7,5,1),(4,4,1),(4,5,1),(1,4,1),(1,5,1)\}$; and $REG_3^{ECP} = \{(9,4,1),(9,5,1),(6,4,1),(6,5,1),(3,4,1),(3,5,1),(0,4,1),(0,5,1)\}$.

Optionally, when a cyclic prefix (CP) is an extended CP and a subframe type is LTE frame structure type 2 FS2, the resource element group set A includes two or more of the following resource element groups:

$REG_0^{ECP,FS2} = \{(11,1,1),(11,2,1),(8,1,1),(8,2,1),(5,1,1),(5,2,1),(2,1,1),(2,2,1)\}$;

$REG_1^{ECP,FS2} = \{(10,1,1),(10,2,1),(7,1,1),(7,2,1),(4,1,1),(4,2,1),(1,1,1),(1,2,1)\}$; and $REG_2^{ECP,FS2} = \{(9,1,1),(9,2,1),(6,1,1),(6,2,1),(3,1,1),(3,2,1),(0,1,1),(0,2,1)\}$.

Optionally, a resource element group pair $(REG_{i_1}, REG_{i_2})$ used by the two antenna port subsets in the antenna port set corresponding to the first reference signal configuration is $(REG_1^{ECP}, REG_2^{ECP})$, $(REG_2^{ECP}, REG_3^{ECP})$, or $(REG_3^{ECP}, REG_0^{ECP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_1^{NCP,FS2})$, $(REG_1^{NCP,FS2}, REG_2^{NCP,FS2})$, or $(REG_2^{NCP,FS2}, REG_0^{NCP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_2^{ECP})$, $(REG_1^{ECP}, REG_3^{ECP})$, $(REG_2^{ECP}, REG_0^{ECP})$ or $(REG_3^{ECP}, REG_1^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_2^{ECP,FS2})$, $(REG_1^{ECP,FS2}, REG_0^{ECP,FS2})$, or $(REG_2^{ECP,FS2}, REG_1^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_0^{ECP})$, $(REG_2^{ECP}, REG_3^{ECP})$, or $(REG_3^{ECP}, REG_2^{ECP})$.

A second aspect provides a reference signal transmission method. The method includes sending reference signal resource configuration information to user equipment, where the reference signal resource configuration information includes antenna port quantity information and a resource configuration index, and the antenna port quantity information and the resource configuration index are used to indicate a reference signal configuration in a reference signal configuration set, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where a resource element (RE) that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair. The method also includes determining, according to the reference signal configuration indicated by the reference signal resource configuration information, positions of the resource elements (REs) that are used to send a reference signal on the antenna ports in the antenna port set corresponding to the reference signal configuration; and sending the reference signal to the user equipment at the positions.

In a first possible implementation manner, the first RB pair and the second RB pair are separately located at different frequency domain positions in a same subframe or located in a same subband of different subframes.

With reference to the second aspect or the first possible implementation manner of the second aspect, in a second possible implementation manner, a resource element group used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A=\{REG_i | i=0, 1, \ldots, M-1\}$, $M \geq 2$, where an intersection of different resource element groups in the set A is an empty set, $i_1, i_2 \in \{0, \ldots, M-1\}$, $M \geq 2$, and $i_1$ and $i_2$ are indexes of the resource element groups (REGs) used in the two RB pairs respectively; and each resource element group in the set A represents a set of position triplets (k',l',$n_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s$ mod 2 represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0,1, \ldots, M-1\}$, and $i_1, i_2, j_1$ and $j_2$ meet at least one of the following relationships: $j_1=(i_1+n) \bmod M$, $j_2=(i_2+n) \bmod M$, and $j_1=i_2$, $j_2=i_1$, where n represents a shift whose value is an integer.

Optionally, when a cyclic prefix (CP) is a normal CP, the resource element group set A includes two or more of the following resource element groups:

$REG_0^{NCP}=\{(9,5,0),(9,6,0),(8,5,0),(8,6,0),(3,5,0),(3,6,0),(2,5,0),(2,6,0)\}$;

$REG_1^{NCP}=\{(11,2,1),(11,3,1),(10,2,1),(10,3,1),(5,2,1),(5,3,1),(4,2,1),(4,3,1)\}$;

$REG_2^{NCP}=\{(9,2,1),(9,3,1),(8,2,1),(8,3,1),(3,2,1),(3,3,1),(2,2,1),(2,3,1)\}$;

$REG_3^{NCP}=\{(7,2,1),(7,3,1),(6,2,1),(6,3,1),(1,2,1),(1,3,1),(0,2,1),(0,3,1)\}$; and $REG_4^{NCP}=\{(9,5,1),(9,6,1),(8,5,1),(8,6,1),(3,5,1),(3,6,1),(2,5,1),(2,6,1)\}$.

Optionally, when a cyclic prefix (CP) is a normal CP and a subframe type is LTE frame structure type 2 FS2, the resource element group set A includes two or more of the following resource element groups:

$REG_0^{NCP,FS2}=\{(11,1,1),(11,3,1),(10,1,1),(10,3,1),(5,1,1),(5,3,1),(4,1,1),(4,3,1)\}$;

$REG_1^{NCP,FS2}=\{(9,1,1),(9,3,1),(8,1,1),(8,3,1),(3,1,1),(3,3,1),(2,1,1),(2,3,1)\}$; and $REG_2^{NCP,FS2}=\{(7,1,1),(7,3,1),(6,1,1),(6,3,1),(1,1,1),(1,3,1),(0,1,1),(0,3,1)\}$.

Optionally, a resource element group pair ($REG_{i_1}$, $REG_{i_2}$) used by the two antenna port subsets in the antenna port set corresponding to the first reference signal configuration is ($REG_0^{NCP}$, $REG_1^{NCP}$), ($REG_1^{NCP}$, $REG_2^{NCP}$), ($REG_2^{NCP}$, $REG_3^{NCP}$), ($REG_3^{NCP}$, $REG_4^{NCP}$), or ($REG_4^{NCP}$, $REG_0^{NCP}$).

Optionally, a resource element group pair ($REG_{i_1}$, $REG_{i_2}$) used by the two antenna port subsets in the antenna port set corresponding to the first reference signal configuration is ($REG_0^{NCP,FS2}$, $REG_1^{NCP,FS2}$), ($REG_1^{NCP,FS2}$, $REG_2^{NCP,FS2}$), or ($REG_2^{NCP,FS2}$, $REG_0^{NCP,FS2}$).

Optionally, a resource element group pair ($REG_{i_1}$, $REG_{i_2}$) used by the two antenna port subsets in the antenna port set corresponding to the first reference signal configuration is ($REG_0^{NCP}$, $REG_4^{NCP}$), ($REG_1^{NCP}$, $REG_3^{NCP}$), ($REG_2^{NCP}$, $REG_1^{NCP}$), ($REG_3^{NCP}$, $REG_2^{NCP}$), or ($REG_4^{NCP}$, $REG_0^{NCP}$).

Optionally, a resource element group pair ($REG_{i_1}$, $REG_{i_2}$) used by the two antenna port subsets in the antenna port set corresponding to the first reference signal configuration is ($REG_0^{NCP,FS2}$, $REG_2^{NCP,FS2}$), ($REG_1^{NCP,FS2}$, $REG_0^{NCP,FS2}$), or ($REG_2^{NCP,FS2}$, $REG_1^{NCP,FS2}$).

Optionally, a resource element group pair ($REG_{i_1}$, $REG_{i_2}$) used by the two antenna port subsets in the antenna port set corresponding to the first reference signal configuration is ($REG_0^{NCP}$, $REG_4^{NCP}$), ($REG_1^{NCP}$, $REG_2^{NCP}$), ($REG_2^{NCP}$, $REG_3^{NCP}$), ($REG_3^{NCP}$, $REG_1^{NCP}$), or ($REG_4^{NCP}$, $REG_0^{NCP}$).

Optionally, when a cyclic prefix (CP) is an extended CP, the resource element group set A includes two or more of the following resource element groups:

$REG_0^{ECP}=\{(11,4,0),(11,5,0),(8,4,0),(8,5,0),(5,4,0),(5,5,0),(2,4,0),(2,5,0)\}$ $REG_1^{ECP}=\{(9,4,0),(9,5,0),(6,4,0),(6,5,0),(3,4,0),(3,5,0),(0,4,0),(0,5,0)\}$;

$REG_2^{ECP}=\{(10,4,1),(10,5,1),(7,4,1),(7,5,1),(4,4,1),(4,5,1),(1,4,1),(1,5,1)\}$; and $REG_3^{ECP}=\{(9,4,1),(9,5,1),(6,4,1),(6,5,1),(3,4,1),(3,5,1),(0,4,1),(0,5,1)\}$.

Optionally, when a cyclic prefix (CP) is an extended CP and a subframe type is LTE frame structure type 2 FS2, the resource element group set A includes two or more of the following resource element groups:

$REG_0^{ECP,FS2}=\{(11,1,1)(11,2,1),(8,1,1),(8,2,1),(5,1,1),(5,2,1),(2,1,1),(2,2,1)\}$;

$REG_1^{ECP,FS2}=\{(10,1,1),(10,2,1),(7,1,1),(7,2,1),(4,1,1),(4,2,1),(1,1,1),(1,2,1)\}$; and $REG_2^{ECP,FS2}=\{(9,1,1),(9,2,1),(6,1,1),(6,2,1),(3,1,1),(3,2,1),(0,1,1),(0,2,1)\}$.

Optionally, a resource element group ($REG_{i_1}$, $REG_{i_2}$) used by the two antenna port subsets in the antenna port set corresponding to the first reference signal configuration is ($REG_0^{ECP}$, $REG_1^{ECP}$), ($REG_1^{ECP}$, $REG_2^{ECP}$), ($REG_2^{ECP}$, $REG_3^{ECP}$), or ($REG_3^{ECP}$, $REG_0^{ECP}$).

Optionally, a resource element group pair $(REG_{i_1}, REG_{i_2})$ used by the two antenna port subsets in the antenna port set corresponding to the first reference signal configuration is $(REG_0^{ECP,FS2}, REG_1^{ECP,FS2})$, $(REG_1^{ECP,FS2}, REG_2^{ECP,FS2})$, or $(REG_2^{ECP,FS2}, REG_0^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_2^{ECP})$, $(REG_1^{ECP}, REG_3^{ECP})$, $(REG_2^{ECP}, REG_0^{ECP})$, or $(REG_3^{ECP}, REG_1^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_2^{ECP,FS2})$, $(REG_1^{ECP,FS2}, REG_0^{ECP,FS2})$, or $(REG_2^{ECP,FS2}, REG_1^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_0^{ECP})$, $(REG_2^{ECP}, REG_3^{ECP})$, or $(REG_3^{ECP}, REG_2^{ECP})$.

A third aspect provides user equipment. The user equipment includes a receiving unit, configured to receive reference signal resource configuration information sent by a base station, where the reference signal resource configuration information includes antenna port quantity information and a resource configuration index. Also included is a determining unit, configured to determine a reference signal configuration from a reference signal configuration set according to the antenna port quantity information and the resource configuration index that are received by the receiving unit, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where an RE that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair. Also included is a position acquiring unit, configured to obtain, according to the reference signal configuration determined by the determining unit, positions of the resource elements (REs) that are used to send a reference signal on the antenna ports in the antenna port set, where: the receiving unit is further configured to receive the reference signal according to the positions of the REs obtained by the position acquiring unit.

In a first possible implementation manner, the first RB pair and the second RB pair are separately located at different frequency domain positions in a same subframe or located in a same subband of different subframes.

With reference to the third aspect or the first possible implementation manner of the third aspect, in a second possible implementation manner, a resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A=\{REG_i | i=0,1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs respectively; and each resource element group in the set A represents a set of position triplets $(k', l', n_s \bmod 2)$ of resource elements (REs) in an RB pair that are used to send reference signals, relative to the RB pair in which the resource elements (REs) are located, where $k'$ represents an index of a subcarrier of the resource element (RE), in the RB pair in which the resource element (RE) is located, $l'$ represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s \bmod 2$ represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2, j_1, j_2 \in \{0, 1, \ldots, M-1\}$, and $i_1, i_2, j_1$ and $j_2$ meet at least one of the following relationships: $j_1=(i_1+n) \bmod M$, $j_2=(i_2+n) \bmod M$, and $j_1=i_2, j_2=i_1$, where n represents a shift whose value is an integer.

Optionally, when a cyclic prefix (CP) is a normal CP, the resource element group set A includes two or more of the following resource element groups:

$REG_0^{NCP}=\{(9,5,0),(9,6,0),(8,5,0),(8,6,0),(3,5,0),(3,6,0),(2,5,0),(2,6,0)\};$ $REG_1^{NCP}=\{(11,2,1),(11,3,1),(10,2,1),(10,3,1),(5,2,1),(5,3,1),(4,2,1),(4,3,1)\};$ $REG_2^{NCP}=\{(9,2,1),(9,3,1),(8,2,1),(8,3,1),(3,2,1),(3,3,1),(2,2,1),(2,3,1)\};$ $REG_3^{NCP}=\{(7,2,1),(7,3,1),(6,2,1),(6,3,1),(1,2,1),(1,3,1),(0,2,1),(0,3,1)\};$ and $REG_4^{NCP}=\{(9,5,1),(9,6,1),(8,5,1),(8,6,1),(3,5,1),(3,6,1),(2,5,1),(2,6,1)\}.$ Optionally, when a cyclic prefix (CP) is a normal CP and a subframe type is LTE frame structure type 2 FS2, the resource element group set A includes two or more of the following resource element groups:

$REG_0^{NCP,FS2}=\{(11,1,1),(11,3,1),(10,1,1),(10,3,1),(5,1,1),(5,3,1),(4,1,1),(4,3,1)\};$ $REG_1^{NCP,FS2}=\{(9,1,1),(9,3,1),(8,1,1),(8,3,1),(3,1,1),(3,3,1),(2,1,1),(2,3,1)\};$ and $REG_2^{NCP,FS2}=\{(7,1,1),(7,3,1),(6,1,1),(6,3,1),(1,1,1),(1,3,1),(0,1,1),(0,3,1)\}.$ Optionally, a resource element group pair $(REG_{i_1}, REG_{i_2})$ used by the two antenna port subsets in the antenna port set corresponding to the first reference signal configuration is $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_1^{NCP,FS2})$, $(REG_1^{NCP,FS2}, REG_2^{NCP,FS2})$, or $(REG_2^{NCP,FS2}, REG_0^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_3^{NCP})$, $(REG_2^{NCP}, REG_1^{NCP})$, $(REG_3^{NCP}, REG_2^{NCP})$, or $(REG_4^{NCP}, REG_0^{NCP})$.

Optionally, a resource element group pair ($REG_{i_1}$, $REG_{i_2}$) used by the two antenna port subsets in the antenna port set corresponding to the first reference signal configuration is ($REG_0^{NCP,FS2}$, $REG_2^{NCP,FS2}$), ($REG_1^{NCP,FS2}$, $REG_0^{NCP,FS2}$), or ($REG_2^{NCP,FS2}$, $REG_1^{NCP,FS2}$).

Optionally, a resource element group pair ($REG_{i_1}$, $REG_{i_2}$) used by the two antenna port subsets in the antenna port set corresponding to the first reference signal configuration is ($REG_0^{NCP}$, $REG_4^{NCP}$), ($REG_1^{NCP}$, $REG_2^{NCP}$), ($REG_2^{NCP}$, $REG_3^{NCP}$), ($REG_3^{NCP}$, $REG_1^{NCP}$), or ($REG_4^{NCP}$, $REG_0^{NCP}$).

Optionally, when a cyclic prefix (CP) is an extended CP, the resource element group set A includes two or more of the following resource element groups:

$REG_0^{ECP} = \{(11,4,0),(11,5,0),(8,4,0),(8,5,0),(5,4,0),(5,5,0),(2,4,0),(2,5,0)\}$;

$REG_1^{ECP} = \{(9,4,0),(9,5,0),(6,4,0),(6,5,0),(3,4,0),(3,5,0),(0,4,0),(0,5,0)\}$;

$REG_2^{ECP} = \{(10,4,1),(10,5,1),(7,4,1),(7,5,1),(4,4,1),(4,5,1),(1,4,1),(1,5,1)\}$; and $REG_3^{ECP} = \{(9,4,1),(9,5,1),(6,4,1),(6,5,1),(3,4,1),(3,5,1),(0,4,1),(0,5,1)\}$.

Optionally, when a cyclic prefix (CP) is an extended CP and a subframe type is LTE frame structure type 2 FS2, the resource element group set A includes two or more of the following resource element groups:

$REG_0^{ECP,FS2} = \{(11,1,1)(11,2,1)(8,1,1),(8,2,1),(5,1,1),(5,2,1),(2,1,1),(2,2,1)\}$;

$REG_1^{ECP,FS2} = \{(10,1,1)(10,2,1),(7,1,1),(7,2,1),(4,1,1),(4,2,1),(1,1,1),(1,2,1)\}$; and $REG_2^{ECP,FS2} = \{(9,1,1),(9,2,1),(6,1,1),(6,2,1),(3,1,1),(3,2,1),(0,1,1),(0,2,1)\}$.

Optionally, a resource element group pair ($REG_{i_1}$, $REG_{i_2}$) used by the two antenna port subsets in the antenna port set corresponding to the first reference signal configuration is ($REG_0^{ECP}$, $REG_1^{ECP}$), ($REG_1^{ECP}$, $REG_2^{ECP}$), ($REG_2^{ECP}$, $REG_3^{ECP}$), or ($REG_3^{ECP}$, $REG_0^{ECP}$).

Optionally, a resource element group pair ($REG_{i_1}$, $REG_{i_2}$) used by the two antenna port subsets in the antenna port set corresponding to the first reference signal configuration is ($REG_0^{ECP,FS2}$, $REG_1^{ECP,FS2}$), ($REG_1^{ECP,FS2}$, $REG_2^{ECP,FS2}$), or ($REG_2^{ECP,FS2}$, $REG_0^{ECP,FS2}$).

Optionally, a resource element group pair ($REG_{i_1}$, $REG_{i_2}$) used by the two antenna port subsets in the antenna port set corresponding to the first reference signal configuration is ($REG_0^{ECP}$, $REG_2^{ECP}$), ($REG_1^{ECP}$, $REG_3^{ECP}$), ($REG_2^{ECP}$, $REG_0^{ECP}$), or ($REG_3^{ECP}$, $REG_1^{ECP}$).

Optionally, a resource element group pair ($REG_{i_1}$, $REG_{i_2}$) used by the two antenna port subsets in the antenna port set corresponding to the first reference signal configuration is ($REG_0^{ECP,FS2}$, $REG_2^{ECP,FS2}$), ($REG_1^{ECP,FS2}$, $REG_0^{ECP,FS2}$), or ($REG_2^{ECP,FS2}$, $REG_1^{ECP,FS2}$).

Optionally, a resource element group pair ($REG_{i_1}$, $REG_{i_2}$) used by the two antenna port subsets in the antenna port set corresponding to the first reference signal configuration is ($REG_0^{ECP}$, $REG_1^{ECP}$), ($REG_1^{ECP}$, $REG_0^{ECP}$), ($REG_2^{ECP}$, $REG_3^{ECP}$), or ($REG_3^{ECP}$, $REG_2^{ECP}$).

A fourth aspect provides a base station. The base station includes a sending unit, configured to send reference signal resource configuration information to user equipment, where the reference signal resource configuration information includes antenna port quantity information and a resource configuration index, and the antenna port quantity information and the resource configuration index are used to indicate a reference signal configuration in a reference signal configuration set, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where a resource element (RE) that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair. The base station also includes a determining unit, configured to determine, according to the reference signal configuration indicated by the sent reference signal resource configuration information, positions of the resource elements (REs) that are used to send a reference signal on the antenna ports in the antenna port set corresponding to the reference signal configuration, where: the sending unit is further configured to send the reference signal to the user equipment at the positions determined by the determining unit.

In a first possible implementation manner, the first RB pair and the second RB pair are separately located at different frequency domain positions in a same subframe or located in a same subband of different subframes.

With reference to the fourth aspect or the first possible implementation manner of the fourth aspect, in a second possible implementation manner, a resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A = \{REG_i | i=0,1,\ldots,M-1\}$, $M \geq 2$, where an intersection of different resource element groups in the set A is an empty set, $i_1, i_2 \in \{0,\ldots,M-1\}$, $M \geq 2$, and $i_1$ and $i_2$ are indexes of the resource element groups (REGs) used in the two RB pairs respectively; and each resource element group in the set A represents a set of position triplets (k',l', $n_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s$ mod 2 represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0,1,\ldots,M-1\}$, and $i_1$, $i_2$, $j_1$ and $j_2$ meet at least one of the following relationships: $j_1 = (i_1+n) \bmod M$, $j_2 = (i_2+n) \bmod M$, and $j_1 = i_2$, $j_2 = i_1$, where n represents a shift whose value is an integer.

Optionally, when a cyclic prefix (CP) is a normal CP, the resource element group set A includes two or more of the following resource element groups:

$REG_0^{NCP} = \{(9,5,0),(9,6,0),(8,5,0),(8,6,0),(3,5,0),(3,6,0),(2,5,0),(2,6,0)\}$;

$REG_1^{NCP} = \{(11,2,1),(11,3,1),(10,2,1),(10,3,1),(5,2,1),(5,3,1),(4,2,1),(4,3,1)\}$;

$REG_2^{NCP} = \{(9,2,1),(9,3,1),(8,2,1),(8,3,1),(3,2,1),(3,3,1),(2,2,1),(2,3,1)\}$;

$REG_3^{NCP} = \{(7,2,1),(7,3,1),(6,2,1),(6,3,1),(1,2,1),(1,3,1),(0,2,1),(0,3,1)\}$; and $REG_4^{NCP} = \{(9,5,1),(9,6,1),(8,5,1),(8,6,1),(3,5,1),(3,6,1),(2,5,1),(2,6,1)\}$.

Optionally, when a cyclic prefix (CP) is a normal CP and a subframe type is LTE frame structure type 2 FS2, the resource element group set A includes two or more of the following resource element groups:

$REG_0^{NCP,FS2} = \{(11,1,1),(11,3,1),(10,1,1),(10,3,1),(5,1,1),(5,3,1),(4,1,1),(4,3,1)\}$;

$REG_1^{NCP,FS2} = \{(9,1,1),(9,3,1),(8,1,1),(8,3,1),(3,1,1),(3,3,1),(2,1,1),(2,3,1)\}$; and $REG_2^{NCP,FS2} = \{(7,1,1),(7,3,1),(6,1,1),(6,3,1),(1,1,1),(1,3,1),(0,1,1),(0,3,1)\}$.

Optionally, a resource element group pair $(REG_{i_1}, REG_{i_2})$ used by the two antenna port subsets in the antenna port set corresponding to the first reference signal configuration is $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_1^{NCP,FS2})$, $(REG_1^{NCP,FS2}, REG_2^{NCP,FS2})$, or $(REG_2^{NCP,FS2}, REG_0^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_3^{NCP})$, $(REG_2^{NCP}, REG_1^{NCP})$, $(REG_3^{NCP}, REG_2^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_2^{NCP,FS2})$, $(REG_1^{NCP,FS2}, REG_0^{NCP,FS2})$, or $(REG_2^{NCP,FS2}, REG_1^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_2^{NCP})$, $(REG_2^{NCP}, REG_3^{NCP})$, $(REG_3^{NCP}, REG_1^{NCP})$, or $(REG_4^{NCP}, REG_0^{NCP})$.

Optionally, when a cyclic prefix (CP) is an extended CP, the resource element group set A includes two or more of the following resource element groups:

$REG_0^{ECP} = \{(11,4,0),(11,5,0),(8,4,0),(8,5,0),(5,4,0),(5,5,0),(2,4,0),(2,5,0)\}$;

$REG_1^{ECP} = \{(9,4,0),(9,5,0),(6,4,0),(6,5,0),(3,4,0),(3,5,0),(0,4,0),(0,5,0)\}$ $REG_2^{ECP} = \{(10,4,1),(10,5,1),(7,4,1),(7,5,1),(4,4,1),(4,5,1),(1,4,1),(1,5,1)\}$; and $REG_3^{ECP} = \{(9,4,1),(9,5,1),(6,4,1),(6,5,1),(3,4,1),(3,5,1),(0,4,1),(0,5,1)\}$.

Optionally, when a cyclic prefix (CP) is an extended CP and a subframe type is LTE frame structure type 2 FS2, the resource element group set A includes two or more of the following resource element groups:

$REG_0^{ECP,FS2} = \{(11,1,1),(11,2,1),(8,1,1),(8,2,1),(5,1,1),(5,2,1),(2,1,1),(2,2,1)\}$;

$REG_1^{ECP,FS2} = \{(10,1,1),(10,2,1),(7,1,1),(7,2,1),(4,1,1),(4,2,1),(1,1,1),(1,2,1)\}$; and $REG_2^{ECP,FS2} = \{(9,1,1),(9,2,1),(6,1,1),(6,2,1),(3,1,1),(3,2,1),(0,1,1),(0,2,1)\}$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_2^{ECP})$, $(REG_2^{ECP}, REG_3^{ECP})$, or $(REG_3^{ECP}, REG_0^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_1^{ECP,FS2})$, $(REG_1^{ECP,FS2}, REG_2^{ECP,FS2})$, or $(REG_2^{ECP,FS2}, REG_0^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_2^{ECP})$, $(REG_1^{ECP}, REG_3^{ECP})$, $(REG_2^{ECP}, REG_0^{ECP})$, or $(REG_3^{ECP}, REG_1^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_2^{ECP,FS2})$, $(REG_1^{ECP,FS2}, REG_0^{ECP,FS2})$, or $(REG_2^{ECP,FS2}, REG_1^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_0^{ECP})$, $(REG_2^{ECP}, REG_3^{ECP})$, or $(REG_3^{ECP}, REG_2^{ECP})$.

A fifth aspect provides user equipment. The user equipment includes a receiver, configured to receive reference signal resource configuration information sent by a base station, where the reference signal resource configuration information includes antenna port quantity information and a resource configuration index. Also included is a processor, configured to determine a reference signal configuration from a reference signal configuration set according to the antenna port quantity information and the resource configuration index that are received by the receiver, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where an RE that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair; and configured to obtain, according to the determined reference signal configuration, positions of the resource elements (REs) that are used to send a reference signal on the antenna ports in the antenna port set, where: the receiver is further configured to receive the reference signal according to the positions of the REs obtained by the processor.

In a first possible implementation manner, the first RB pair and the second RB pair are separately located at different frequency domain positions in a same subframe or located in a same subband of different subframes.

With reference to the fifth aspect or the first possible implementation manner of the fifth aspect, in a second possible implementation manner, a resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A=\{REG_i | i=0, 1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs respectively; and each resource element group in the set A represents a set of position triplets (k',l', $n_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s$ mod 2 represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0, 1, \ldots, M-1\}$, and $i_1$, $i_2$, $j_1$ and $j_2$ meet at least one of the following relationships: $j_1 = (i_1+n) \mod M$, $j_2 = (i_2+n) \mod M$, and $j_1 = i_2$, $j_2 = i_1$, where n represents a shift whose value is an integer.

Optionally, when a cyclic prefix (CP) is a normal CP, the resource element group set A includes two or more of the following resource element groups:

$REG_0^{NCP} = \{(9,5,0),(9,6,0),(8,5,0),(8,6,0),(3,5,0),(3,6,0),(2,5,0),(2,6,0)\}$;

$REG_1^{NCP} = \{(11,2,1),(11,3,1),(10,2,1),(10,3,1),(5,2,1),(5,3,1),(4,2,1),(4,3,1)\}$;

$REG_2^{NCP} = \{(9,2,1),(9,3,1),(8,2,1),(8,3,1),(3,2,1),(3,3,1),(2,2,1),(2,3,1)\}$;

$REG_3^{NCP} = \{(7,2,1),(7,3,1),(6,2,1),(6,3,1),(1,2,1),(1,3,1),(0,2,1),(0,3,1)\}$; and $REG_4^{NCP} = \{(9,5,1),(9,6,1),(8,5,1),(8,6,1),(3,5,1),(3,6,1),(2,5,1),(2,6,1)\}$.

Optionally, when a cyclic prefix (CP) is a normal CP and a subframe type is LTE frame structure type 2 FS2, the resource element group set A includes two or more of the following resource element groups:

$REG_0^{NCP,FS2} = \{(11,1,1),(11,3,1),(10,1,1),(10,3,1),(5,1,1),(5,3,1),(4,1,1),(4,3,1)\}$.

$REG_1^{NCP,FS2} = \{(9,1,1),(9,3,1),(8,1,1),(8,3,1),(3,1,1),(3,3,1),(2,1,1),(2,3,1)\}$;

$REG_2^{NCP,FS2} = \{(7,1,1),(7,3,1),(6,1,1),(6,3,1),(1,1,1),(1,3,1),(0,1,1),(0,3,1)\}$; and Optionally, a resource element group pair $(REG_{i_1}, REG_{i_2})$ used by the two antenna port subsets in the antenna port set corresponding to the first reference signal configuration is $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_1^{NCP,FS2})$, $(REG_1^{NCP,FS2}, REG_2^{NCP,FS2})$, or $(REG_2^{NCP,FS2}, REG_0^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_3^{NCP})$, $(REG_2^{NCP}, REG_1^{NCP})$, $(REG_3^{NCP}, REG_2^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_2^{NCP,FS2})$, $(REG_1^{NCP,FS2}, REG_0^{NCP,FS2})$, or $(REG_2^{NCP,FS2}, REG_1^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_2^{NCP})$, $(REG_2^{NCP}, REG_4^{NCP})$, $(REG_3^{NCP}, REG_1^{NCP})$, or $(REG_4^{NCP}, REG_0^{NCP})$.

Optionally, when a cyclic prefix (CP) is an extended CP, the resource element group set A includes two or more of the following resource element groups:

$REG_0^{ECP} = \{(11,4,0),(11,5,0),(8,4,0),(8,5,0),(5,4,0),(5,5,0),(2,4,0),(2,5,0)\}$ $REG_1^{ECP} = \{(9,4,0),(9,5,0),(6,4,0),(6,5,0),(3,4,0),(3,5,0),(0,4,0),(0,5,0)\}$;

$REG_2^{ECP} = \{(10,4,1),(10,5,1),(7,4,1),(7,5,1),(4,4,1),(4,5,1),(1,4,1),(1,5,1)\}$; and $REG_3^{ECP} = \{(9,4,1),(9,5,1),(6,4,1),(6,5,1),(3,4,1),(3,5,1),(0,4,1),(0,5,1)\}$.

Optionally, when a cyclic prefix (CP) is an extended CP and a subframe type is LTE frame structure type 2 FS2, the resource element group set A includes two or more of the following resource element groups:

$REG_0^{ECP,FS2} = \{(11,1,1),(11,2,1),(8,1,1),(8,2,1),(5,1,1),(5,2,1),(2,1,1),(2,2,1)\}$;

$REG_1^{ECP,FS2} = \{(10,1,1),(10,2,1),(7,1,1),(7,2,1),(4,1,1),(4,2,1),(1,1,1),(1,2,1)\}$; and $REG_2^{ECP,FS2} = \{(9,1,1),(9,2,1),(6,1,1),(6,2,1),(3,1,1),(3,2,1),(0,1,1),(0,2,1)\}$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_2^{ECP})$, $(REG_2^{ECP}, REG_3^{ECP})$, or $(REG_3^{ECP}, REG_0^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_1^{ECP,FS2})$, $(REG_1^{ECP,FS2}, REG_2^{ECP,FS2})$, or $(REG_2^{ECP,FS2}, REG_0^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_2^{ECP})$, $(REG_1^{ECP}, REG_3^{ECP})$, $(REG_2^{ECP}, REG_0^{ECP})$, or $(REG_3^{ECP}, REG_1^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_2^{ECP,FS2})$, $(REG_1^{ECP,FS2}, REG_0^{ECP,FS2})$, or $(REG_2^{ECP,FS2}, REG_1^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_0^{ECP})$, $(REG_2^{ECP}, REG_3^{ECP})$, or $(REG_3^{ECP}, REG_2^{ECP})$.

A sixth aspect provides a base station. The base station includes a transmitter, configured to send reference signal resource configuration information to user equipment, where the reference signal resource configuration information includes antenna port quantity information and a resource configuration index, and the antenna port quantity information and the resource configuration index are used to indicate a reference signal configuration in a reference signal configuration set, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where a resource element (RE) that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair. Also included is a processor, configured to determine, according to the reference signal configuration indicated by the sent reference signal resource configuration information, positions of the resource elements (REs) that are used to send a reference signal on the antenna ports in the antenna port set corresponding to the reference signal configuration, where: the transmitter is further configured to send the reference signal to the user equipment at the positions determined by the processor.

In a first possible implementation manner, the first RB pair and the second RB pair are separately located at different frequency domain positions in a same subframe or located in a same subband of different subframes.

With reference to the sixth aspect or the first possible implementation manner of the sixth aspect, in a second possible implementation manner, a resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A = \{REG_i | i = 0, 1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs respectively; and each resource element group in the set A represents a set of position triplets $(k', l', n_s \bmod 2)$ of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s \bmod 2$ represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0, 1, \ldots, M-1\}$, and $i_1$, $i_2$, $j_1$ and $j_2$ meet at least one of the following relationships: $j_1 = (i_1 + n) \bmod M$, $j_2 = (i_2 + n) \bmod M$, and $j_1 = i_2$, $j_2 = i_1$, where n represents a shift whose value is an integer.

Optionally, when a cyclic prefix (CP) is a normal CP, the resource element group set A includes two or more of the following resource element groups:

$REG_0^{NCP} = \{(9,5,0),(9,6,0),(8,5,0),(8,6,0),(3,5,0),(3,6,0),(2,5,0),(2,6,0)\};$ $REG_1^{NCP} = \{(11,2,1),(11,3,1),(10,2,1),(10,3,1),(5,2,1),(5,3,1),(4,2,1),(4,3,1)\};$ $REG_2^{NCP} = \{(9,2,1),(9,3,1),(8,2,1),(8,3,1),(3,2,1),(3,3,1),(2,2,1),(2,3,1)\};$ $REG_3^{NCP} = \{(7,2,1),(7,3,1),(6,2,1),(6,3,1),(1,2,1),(1,3,1),(0,2,1),(0,3,1)\};$ and $REG_4^{NCP} = \{(9,5,1),(9,6,1),(8,5,1),(8,6,1),(3,5,1),(3,6,1),(2,5,1),(2,6,1)\}.$ Optionally, when a cyclic prefix (CP) is a normal CP and a subframe type is LTE frame structure type 2 FS2, the resource element group set A includes two or more of the following resource element groups:

$REG_0^{NCP,FS2} = \{(11,1,1),(11,3,1),(10,1,1),(10,3,1),(5,1,1),(5,3,1),(4,1,1),(4,3,1)\}.$ $REG_1^{NCP,FS2} = \{(9,1,1),(9,3,1),(8,1,1),(8,3,1),(3,1,1),(3,3,1),(2,1,1),(2,3,1)\};$ $REG_2^{NCP,FS2} = \{(7,1,1),(7,3,1),(6,1,1),(6,3,1),(1,1,1),(1,3,1),(0,1,1),(0,3,1)\};$ and Optionally, a resource element group pair $(REG_{i_1}, REG_{i_2})$ used by the two antenna port subsets in the antenna port set corresponding to the first reference signal configuration is $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_1^{NCP,FS2})$, $(REG_1^{NCP,FS2}, REG_2^{NCP,FS2})$, or $(REG_2^{NCP,FS2}, REG_0^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_3^{NCP})$, $(REG_2^{NCP}, REG_1^{NCP})$, $(REG_3^{NCP}, REG_2^{NCP})$, or $(REG_4^{NCP}, REG_0^{NCP})$.

Optionally, a resource element group pair $(REG_{i_1}, REG_{i_2})$ used by the two antenna port subsets in the antenna port set corresponding to the first reference signal configuration is $(REG_0^{NCP,FS2}, REG_2^{NCP,FS2})$, $(REG_1^{NCP,FS2}, REG_0^{NCP,FS2})$, or $(REG_2^{NCP,FS2}, REG_1^{NCP,FS2})$.

Optionally, a resource element group pair $(REG_{i_1}, REG_{i_2})$ used by the two antenna port subsets in the antenna port set corresponding to the first reference signal configuration is $(REG_0^{NCP}, REG_4^{NCP})$, $(REG_1^{NCP}, REG_2^{NCP})$, $(REG_2^{NCP}, REG_1^{NCP})$, $(REG_3^{NCP}, REG_1^{NCP})$, or $(REG_4^{NCP}, REG_0^{NCP})$.

Optionally, when a cyclic prefix (CP) is an extended CP, the resource element group set A includes two or more of the following resource element groups:

$REG_0^{ECP}=\{(11,4,0),(11,5,0),(8,4,0),(8,5,0),(5,4,0),(5,5,0),(2,4,0),(2,5,0)\}$ $REG_1^{ECP}=\{(9,4,0),(9,5,0),(6,4,0),(6,5,0),(3,4,0),(3,5,0),(0,4,0),(0,5,0)\}$;

$REG_2^{ECP}=\{(10,4,1),(10,5,1),(7,4,1),(7,5,1),(4,4,1),(4,5,1),(1,4,1),(1,5,1)\}$; and $REG_3^{ECP}=\{(9,4,1),(9,5,1),(6,4,1),(6,5,1),(3,4,1),(3,5,1),(0,4,1),(0,5,1)\}$.

Optionally, when a cyclic prefix (CP) is an extended CP and a subframe type is LTE frame structure type 2 FS2, the resource element group set A includes two or more of the following resource element groups:

$REG_0^{ECP,FS2}=\{(11,1,1),(11,2,1),(8,1,1),(8,2,1),(5,1,1),(5,2,1),(2,1,1),(2,2,1)\}$;

$REG_1^{ECP,FS2}=\{(10,1,1),(10,2,1),(7,1,1),(7,2,1),(4,1,1),(4,2,1),(1,1,1),(1,2,1)\}$; and $REG_2^{ECP,FS2}=\{(9,1,1),(9,2,1),(6,1,1),(6,2,1),(3,1,1),(3,2,1),(0,1,1),(0,2,1)\}$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_2^{ECP})$, $(REG_2^{ECP}, REG_3^{ECP})$, or $(REG_3^{ECP}, REG_0^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_1^{ECP,FS2})$, $(REG_1^{ECP,FS2}, REG_2^{ECP,FS2})$, or $(REG_2^{ECP,FS2}, REG_0^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_2^{ECP})$, $(REG_1^{ECP}, REG_3^{ECP})$, $(REG_2^{ECP}, REG_0^{ECP})$, or $(REG_3^{ECP}, REG_1^{ECP})$.

Optionally, a resource element group pair $(REG_{i_1}, REG_{i_2})$ used by the two antenna port subsets in the antenna port set corresponding to the first reference signal configuration is $(REG_0^{ECP,FS2}, REG_2^{ECP,FS2})$, $(REG_1^{ECP,FS2}, REG_0^{ECP,FS2})$, or $(REG_2^{ECP,FS2}, REG_1^{ECP,FS2})$.

Optionally, a resource element group pair $(REG_{i_1}, REG_{i_2})$ used by the two antenna port subsets in the antenna port set corresponding to the first reference signal configuration is $(REG_0^{ECP}, REG_1^{ECP})$, $(REG_1^{ECP}, REG_0^{ECP})$, $(REG_2^{ECP}, REG_3^{ECP})$, or $(REG_3^{ECP}, REG_2^{ECP})$.

Compared with the prior art, in the embodiments, user equipment receives reference signal resource configuration information sent by a base station, where the reference signal resource configuration information includes antenna port quantity information and a resource configuration index; the user equipment determines a reference signal configuration from a reference signal configuration set according to the received antenna port quantity information and resource configuration index; and the user equipment obtains, according to the determined reference signal configuration, positions of resource elements (REs) that are used to send reference signals on antenna ports in an antenna port set, and receives, according to the positions of the REs, the reference signals sent by the base station. Therefore, a problem that prior-art reference signals do not support more than eight antenna ports can be resolved, and a feasible design solution for reference signal configuration is provided for an antenna configuration including more than eight antenna ports. In addition, resource element groups used by two antenna port subsets in two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement, and improving a system throughput.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions clearer, the following describes the present invention in detail with reference to the accompanying drawings and the embodiments.

Figure 1:
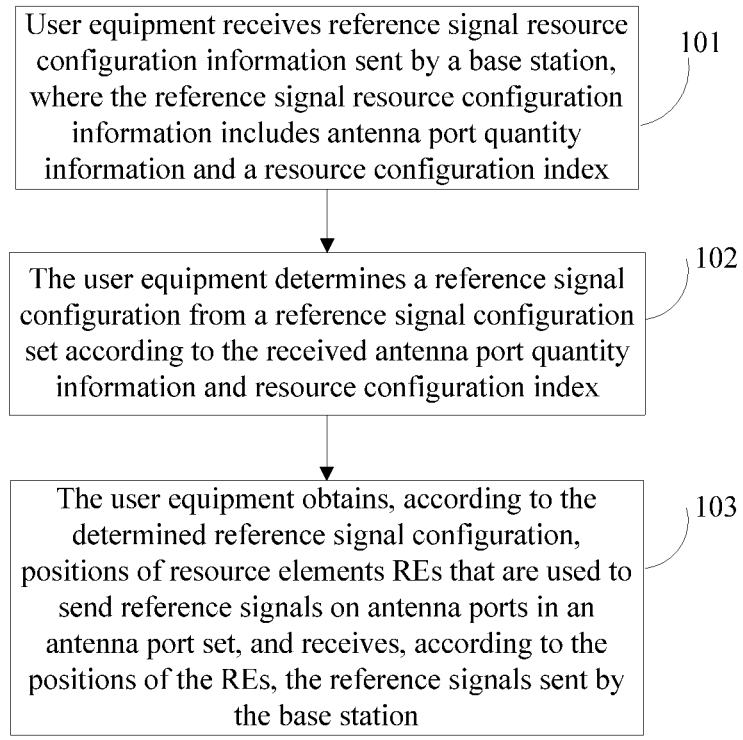
FIG. 1 is a flowchart of a method according to an embodiment.

An embodiment provides a reference signal transmission method. As shown in FIG. 1, the method includes the following steps.

101: User equipment receives reference signal resource configuration information sent by a base station, where the reference signal resource configuration information includes antenna port quantity information and a resource configuration index.

102: The user equipment determines a reference signal configuration from a reference signal configuration set according to the received antenna port quantity information and resource configuration index.

The reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where an RE that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair.

The first RB pair and the second RB pair are separately located at different frequency domain positions in a same subframe or located in a same subband of different subframes.

Further, a resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A = \{REG_i | i = 0, 1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs respectively; and each resource element group in the set A represents a set of position triplets $(k', l', n_s \bmod 2)$ of resource elements (REs) in an RB pair that are used to send reference signals, relative to the RB pair in which the resource elements (REs) are located, where $k'$ represents an index of a subcarrier of the resource element (RE), in the RB pair in which the resource element (RE) is located, $l'$ represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s \bmod 2$ represents a computed value resulting from a modulo 2 operation on $n_s$.

It should be noted that the symbol $\in$ indicates a belonging or subordination relationship. For example, $REG_{i_1} \in A$ indicates that $REG_{i_1}$ is an element in the set A. $\in$ is a commonly used mathematical symbol, and is not described again herein elsewhere.

It should be pointed out that an intersection of different resource element groups in the set A is an empty set. Therefore, the resource element groups $REG_{i_1}$ and $REG_{i_2}$ are two different elements in the set A respectively, that is, an intersection of the two different resource element groups $REG_{i_1}$ and $REG_{i_2}$ is also an empty set.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0, 1, \ldots, M-1\}$, and $i_1$, $i_2$, $j_1$ and $j_2$ meet at least one of the following relationships: $j_1 = (i_1 + n) \bmod M$, $j_2 = (i_2 + n) \bmod M$, and $j_1 = i_2$, $j_2 = i_1$, where n represents a shift whose value is an integer.

Specifically, different resource element groups in the set A may be different position sets of REs that are used to send CSI RSs on eight antenna ports in an LTE R10 system. In this case, the resource element groups used by the two antenna port subsets in the two RB pairs do not have an intersection. In this case, for LTE R10 and R11 systems, an evolved Node B (eNB) may instruct legacy UE to receive, at positions of REs in $REG_{i_1}$ in the first RB pair and the second RB pair, non-zero-power CSI RSs sent on eight antenna ports, and instruct the legacy UE that the eNB sends zero-power CSI RSs at positions of REs in $REG_{i_2}$ in the first RB pair and the second RB pair. For an LTE R12 system or a future system, an eNB may instruct UE to receive, at positions of REs in $REG_{i_1}$ in the first RB pair, non-zero-power CSI RSs sent on first eight antenna ports of 16 antenna ports and to receive, at positions of REs in $REG_{i_2}$ in the second RB pair, non-zero-power CSI RSs sent on the last eight antenna ports of the 16 antenna ports, and the eNB may notify the UE that zero-power CSI RSs are at positions of REs in $REG_{i_2}$ in the first RB pair and at positions of REs in $REG_{i_1}$ in the second RB pair. Both the legacy UE and the UE in the LTE R12 system or the future system can perform correct rate matching for a PDSCH according to the positions of non-zero-power CSI RSs and zero-power CSI RSs notified by the eNB, which avoids mapping the PDSCH to the positions of non-zero-power CSI RSs and zero-power CSI RSs, thereby avoiding interference to the PDSCH. Therefore, in the foregoing reference signal configuration, an RE position occupied by a CSI RS in the LTE R10 system may be reused and interference to legacy UE in a same cell may be reduced.

In addition, in a two-cell example, an eNB instructs UE to: use the first reference signal configuration in a first cell, that is, receive non-zero-power CSI RSs in the resource element group $REG_{i_1}$ in the first RB pair and in the resource element group $REG_{i_2}$ in the second RB pair, and use the second reference signal configuration in a second cell, that is, receive non-zero-power CSI RSs in the resource element group $REG_{j_1}$ in the first RB pair and in the resource element group $REG_{j_2}$ in the second RB pair; and the eNB notifies, in the first cell, the UE that zero-power CSI RSs are in the resource element group $REG_{j_1}$ in the first RB pair and in the resource element group $REG_{j_2}$ in the second RB pair, and the eNB notifies, in the second cell, the UE that zero-power CSI RSs are in the resource element group $REG_{i_1}$ in the first RB pair and in the resource element group $REG_{i_2}$ in the second RB pair. In the two cells, the resource element groups $REG_{i_1}$, $REG_{i_2}$, $REG_{j_1}$, and $REG_{j_2}$ and the indexes $i_1$, $i_2$, $j_1$, and $j_2$ are used in the two different RBs, where $i_1$, $i_2$, $j_1$ and $j_2$ meet at least one of the following relationships: $j_1 = (i_1 + n) \bmod M$, $j_2 = (i_2 + n) \bmod M$, and $j_1 = i_2$, $j_2 = i_1$, where n represents a shift whose value is an integer. Therefore, on one hand, non-zero-power CSI RSs configured by UE in each cell are staggered from, that is, have no intersection with, non-zero-power CSI RSs configured by UE in a neighboring cell, thereby effectively avoiding pilot contamination. On the other hand, UEs in the cells can all perform correct rate matching on a PDSCH according to the positions of non-zero-power CSI RSs and zero-power CSI RSs notified by the eNB, which avoids mapping the PDSCH to the positions of non-zero-power CSI RSs and zero-power CSI RSs, and avoids interference to the PDSCH caused by CSI RSs of a neighboring cell.

Optionally, when a cyclic prefix (CP) is a normal CP (NCP), a position of a resource element (RE) relative to an RB pair in which the resource element (RE) is located is represented by a triplet (k', l',$n_s$ mod 2) That each resource element group includes eight REs is used as an example. The resource element group set A includes two or more of the following resource element groups:

$REG_0^{NCP}$={(9,5,0),(9,6,0),(8,5,0),(8,6,0),(3,5,0),(3,6,0),(2,5,0),(2,6,0)}  (1);

$REG_1^{NCP}$={(11,2,1),(11,3,1),(10,2,1),(10,3,1),(5,2,1),(5,3,1),(4,2,1),(4,3,1)}  (2);

$REG_2^{NCP}$={(9,2,1),(9,3,1),(8,2,1),(8,3,1),(3,2,1),(3,3,1),(2,2,1),(2,3,1)}  (3);

$REG_3^{NCP}$={(7,2,1),(7,3,1),(6,2,1),(6,3,1),(1,2,1),(1,3,1),(0,2,1),(0,3,1)}  (4);

and $REG_4^{NCP}$={(9,5,1),(9,6,1),(8,5,1),(8,6,1),(3,5,1),(3,6,1),(2,5,1),(2,6,1)}  (5).

The resource element group set A may apply to a subframe type being LTE frame structure type 1 (FS1) or frame structure type 2 (FS2).

That each resource element group includes four REs is used as an example. The resource element group set A includes two or more of the following resource element groups:

{(9,5,0),(9,6,0),(8,5,0),(8,6,0)}  (6);

{(3,5,0),(3,6,0),(2,5,0),(2,6,0)}  (7);

{(11,2,1),(11,3,1),(10,2,1),(10,3,1)}  (8);

{(5,2,1),(5,3,1),(4,2,1),(4,3,1)}  (9);

{(9,2,1),(9,3,1),(8,2,1),(8,3,1)}  (10);

{(3,2,1),(3,3,1),(2,2,1),(2,3,1)}  (11);

{(7,2,1),(7,3,1),(6,2,1),(6,3,1)}  (12);

{(1,2,1),(1,3,1),(0,2,1),(0,3,1)}  (13);

{(9,5,1),(9,6,1),(8,5,1),(8,6,1)}  (14);

and

{(3,5,1),(3,6,1),(2,5,1),(2,6,1)}  (15).

The resource element group set A may apply to a subframe type FS1 or FS2.

That each resource element group includes eight REs is used as an example. The resource element group set A may further include two or more of the following resource element groups:

{(11,5,0),(11,6,0),(11,5,1),(11,6,1),(10,5,0),(10,6,0),(10,5,1),(10,6,1)}  (16);

{(6,5,0),(6,6,0),(6,5,1),(6,6,1),(5,5,0),(5,6,0),(5,5,1),(5,6,1)}  (17);

and

{(1,5,0),(1,6,0),(1,5,1),(1,6,1),(0,5,0),(0,6,0),(0,5,1),(0,6,1)}  (18).

That each resource element group includes four REs is used as an example. The resource element group set A may further include two or more of the following resource element groups:

{(11,5,0),(11,6,0),(11,5,1),(11,6,1)}  (19);

{(10,5,0),(10,6,0),(10,5,1),(10,6,1)}  (20);

{(6,5,0),(6,6,0),(6,5,1),(6,6,1)}  (21);

{(5,5,0),(5,6,0),(5,5,1),(5,6,1)}  (22);

{(1,5,0),(1,6,0),(1,5,1),(1,6,1)}  (23);

and

{(0,5,0),(0,6,0),(0,5,1),(0,6,1)}  (24).

The resource element group set A may apply to a subframe type FS1.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the following resource element groups:

$REG_0^{NCP,FS2}$={(11,1,1),(11,3,1),(10,1,1),(10,3,1),(5,1,1),(5,3,1),(4,1,1),(4,3,1)}  (25);

$REG_1^{NCP,FS2}$={(9,1,1),(9,3,1),(8,1,1),(8,3,1),(3,1,1),(3,3,1),(2,1,1),(2,3,1)}  (26);

and $REG_2^{NCP,FS2}$={(7,1,1),(7,3,1),(6,1,1),(6,3,1),(1,1,1),(1,3,1),(0,1,1),(0,3,1)}  (27).

The resource element group set A may apply to a subframe type FS2.

That each resource element group includes four REs is used as an example. The resource element group set A includes two or more of the following resource element groups:

{(11,1,1),(11,3,1),(10,1,1),(10,3,1)}  (28);

{(5,1,1),(5,3,1),(4,1,1),(4,3,1)}  (29);

{(9,1,1),(9,3,1),(8,1,1),(8,3,1)}  (30);

{(3,1,1),(3,3,1),(2,1,1),(2,3,1)}  (31);

{(7,1,1),(7,3,1),(6,1,1),(6,3,1)}  (32);

and

{(1,1,1),(1,3,1),(0,1,1),(0,3,1)}  (33).

The resource element group set A may apply to a subframe type FS2.

For LTE special subframe configurations 1, 2, 6, and 7, that each resource element group includes eight REs is used as an example. The resource element group set A may further include two or more of the following resource element groups:

{(11,2,0),(11,3,0),(11,5,0),(11,6,0),(10,2,0),(10,3,0),(10,5,0),(10,6,0)}  (34);

{(6,2,0),(6,3,0),(6,5,0),(6,6,0),(5,2,0),(5,3,0),(5,5,0),(5,6,0)}  (35);

and

{(1,2,0),(1,3,0),(1,5,0),(1,6,0),(0,2,0),(0,3,0),(0,5,0),(0,6,0)}  (36).

For LTE special subframe configurations 1, 2, 6, and 7, that each resource element group includes four REs is used as an example. The resource element group set A may further include two or more of the following resource element groups:

$$\{(11,2,0),(11,3,0),(11,5,0),(11,6,0)\} \quad (37);$$

$$\{(10,2,0),(10,3,0),(10,5,0),(10,6,0)\} \quad (38);$$

$$\{(6,2,0),(6,3,0),(6,5,0),(6,6,0)\} \quad (39);$$

$$\{(5,2,0),(5,3,0),(5,5,0),(5,6,0)\} \quad (40);$$

$$\{(1,2,0),(1,3,0),(1,5,0),(1,6,0)\} \quad (41);$$

and $$\{(0,2,0),(0,3,0),(0,5,0),(0,6,0)\} \quad (42).$$

For LTE special subframe configurations 3, 4, 8, and 9, that each resource element group includes eight REs is used as an example. The resource element group set A may further include two or more of the following resource element groups:

$$\{(11,2,0),(11,3,0),(11,2,1),(11,3,1),(10,2,0),(10,3,0),(10,2,1),(10,3,1)\} \quad (43);$$

$$\{(6,2,0),(6,3,0),(6,2,1),(6,3,1),(5,2,0),(5,3,0),(5,2,1),(5,3,1)\} \quad (44); \text{ and}$$

$$\{(1,2,0),(1,3,0),(1,2,1),(1,3,1),(0,2,0),(0,3,0),(0,2,1),(0,3,1)\} \quad (45).$$

For LTE special subframe configurations 3, 4, 8, and 9, that each resource element group includes four REs is used as an example. The resource element group set A may further include two or more of the following resource element groups:

$$\{(11,2,0),(11,3,0),(11,2,1),(11,3,1)\} \quad (46);$$

$$\{(10,2,0),(10,3,0),(10,2,1),(10,3,1)\} \quad (47);$$

$$\{(6,2,0),(6,3,0),(6,2,1),(6,3,1)\} \quad (48);$$

$$\{(5,2,0),(5,3,0),(5,2,1),(5,3,1)\} \quad (49);$$

$$\{(1,2,0),(1,3,0),(1,2,1),(1,3,1)\} \quad (50);$$

and $$\{(0,2,0),(0,3,0),(0,2,1),(0,3,1)\} \quad (51);$$

Optionally, when a cyclic prefix (CP) is an extended CP (ECP), a position of a resource element (RE) relative to an RB pair in which the resource element (RE) is located is represented by a triplet $(k',l',n_s \bmod 2)$ That each resource element group includes eight REs is used as an example. The resource element group set A includes two or more of the following resource element groups:

$$REG_0^{ECP}=\{(11,4,0),(11,5,0),(8,4,0),(8,5,0),(5,4,0),(5,5,0),(2,4,0),(2,5,0)\} \quad (52);$$

$$REG_1^{ECP}=\{(9,4,0),(9,5,0),(6,4,0),(6,5,0),(3,4,0),(3,5,0),(0,4,0),(0,5,0)\} \quad (53);$$

$$REG_2^{ECP}=\{(10,4,1),(10,5,1),(7,4,1),(7,5,1),(4,4,1),(4,5,1),(1,4,1),(1,5,1)\} \quad (54);$$

and $$REG_3^{ECP}=\{(9,4,1),(9,5,1),(6,4,1),(6,5,1),(3,4,1),(3,5,1),(0,4,1),(0,5,1)\} \quad (55).$$

The resource element group set or the resource element group may apply to a subframe type FS1 or FS2.

That each resource element group includes four REs is used as an example. The resource element group set A includes two or more of the following resource element groups:

$$\{(11,4,0),(1,5,0),(8,4,0),(8,5,0)\} \quad (56);$$

$$\{(5,4,0),(5,5,0),(2,4,0),(2,5,0)\} \quad (57);$$

$$\{(9,4,0),(9,5,0),(6,4,0),(6,5,0)\} \quad (58);$$

$$\{(3,4,0),(3,5,0),(0,4,0),(0,5,0)\} \quad (59);$$

$$\{(10,4,1),(10,5,1),(7,4,1),(7,5,1)\} \quad (60);$$

$$\{(4,4,1),(4,5,1),(1,4,1),(1,5,1)\} \quad (61);$$

$$\{(9,4,1),(9,5,1),(6,4,1),(6,5,1)\} \quad (62);$$

and $$\{(3,4,1),(3,5,1),(0,4,1),(0,5,1)\} \quad (63).$$

Optionally, when a cyclic prefix (CP) is an extended CP, a position of a resource element (RE) relative to an RB pair in which the resource element (RE) is located is represented by a triplet $(k',l',n_s \bmod 2)$ That each resource element group includes eight REs is used as an example. The resource element group set A includes two or more of the following resource element groups:

$$REG_0^{ECP,FS2}=\{(11,1,1),(11,2,1),(8,1,1),(8,2,1),(5,1,1),(5,2,1),(2,1,1),(2,2,1)\} \quad (64);$$

$$REG_1^{ECP,FS2}=\{(0,1,1),(10,2,1),(7,1,1),(7,2,1),(4,1,1),(4,2,1),(1,1,1),(1,2,1)\} \quad (65); \text{ and}$$

$$REG_2^{ECP,FS2}=\{(9,1,1),(9,2,1),(6,1,1),(6,2,1),(3,1,1),(3,2,1),(0,1,1),(0,2,1)\} \quad (66).$$

The resource element group set or the resource element group may apply to a subframe type FS2.

That each resource element group includes four REs is used as an example. The resource element group set A includes two or more of the following resource element groups:

$$\{(11,1,1),(11,2,1),(8,1,1),(8,2,1)\} \quad (67);$$

$$\{(5,1,1),(5,2,1),(2,1,1),(2,2,1)\} \quad (68);$$

$$\{(10,1,1),(10,2,1),(7,1,1),(7,2,1)\} \quad (69);$$

$$\{(4,1,1),(4,2,1),(1,1,1),(1,2,1)\} \quad (70);$$

$$\{(9,1,1),(9,2,1),(6,1,1),(6,2,1)\} \quad (71);$$

and $$\{(3,1,1),(3,2,1),(0,1,1),(0,2,1)\} \quad (72).$$

The resource element group set or the resource element group may apply to a subframe type FS2.

103: The user equipment obtains, according to the determined reference signal configuration, positions of resource elements (REs) that are used to send reference signals on antenna ports in an antenna port set, and receives, according to the positions of the REs, reference signals sent by the base station.

In step 103, the reference signals are sent by the base station.

Compared with the prior art, in this embodiment of the present invention, user equipment receives reference signal resource configuration information sent by a base station, where the reference signal resource configuration information includes antenna port quantity information and a resource configuration index; the user equipment determines a reference signal configuration from a reference signal configuration set according to the received antenna port quantity information and resource configuration index; and the user equipment obtains, according to the determined reference signal configuration, positions of resource elements (REs) that are used to send reference signals on antenna ports in the antenna port set, and receives, according to the positions of the REs, the reference signals sent by the base station. Therefore, a problem that prior-art reference signals do not support more than eight antenna ports can be resolved, and a feasible design solution for reference signal configuration is provided for an antenna configuration including more than eight antenna ports. In addition, resource element groups used by two antenna port subsets in two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement and improving a system throughput.

Figure 2:
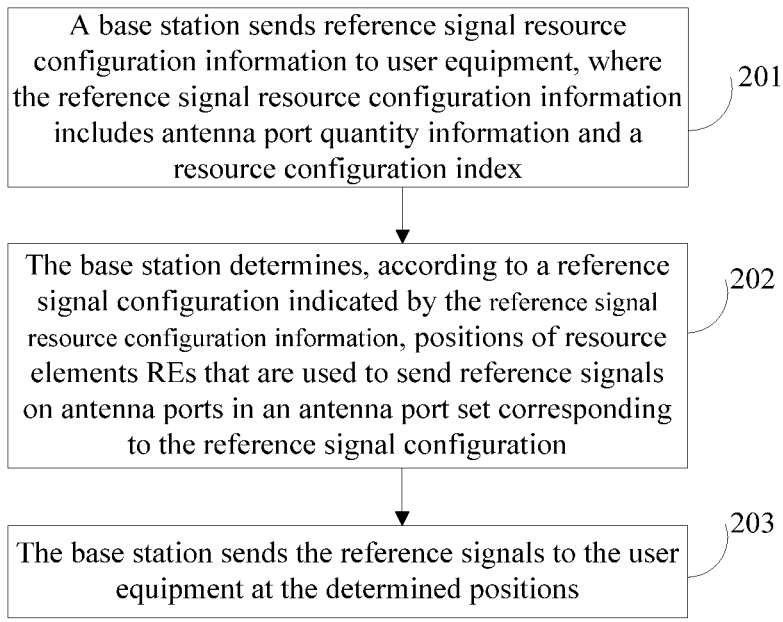
FIG. 2 is a flowchart of another method according to an embodiment.

Another embodiment provides a reference signal sending method. As shown in FIG. 2, the method includes the following steps.

201: A base station sends reference signal resource configuration information to user equipment, where the reference signal resource configuration information includes antenna port quantity information and a resource configuration index.

The antenna port quantity information and the resource configuration index are used to indicate a reference signal configuration in a reference signal configuration set, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where a resource element (RE) that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair.

The first RB pair and the second RB pair are separately located at different frequency domain positions in a same subframe or located in a same subband of different subframes.

Further, a resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A = \{REG_i | i=0,1,\ldots,M-1\}$, $M \geq 2$, an intersection of different resource element groups in the set A is an empty set, $i_1, i_2 \in \{0,\ldots,M-1\}$, $M \geq 2$, and $i_1$ and $i_2$ are indexes of the REGs used in the two RB pairs respectively; and each resource element group in the set A represents a set of position triplets $(k',l',n_s \bmod 2)$ of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an OFDM symbol of the resource element, in the RB pair in which the resource element is located, $n_s$ represents an index of a timeslot to which the resource element belongs, mod represents a modulo operation, and $n_s \bmod 2$ represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0,1,\ldots,M-1\}$, and $i_1, i_2, j_1$ and $j_2$ meet at least one of the following relationships: $j_1 = (i_1+n) \bmod M$, $j_2 = (i_2+n) \bmod M$ and $j_1 = i_2$, $j_2 = i_1$, where n represents a shift whose value is an integer.

Specifically, different resource element groups in the set A may be different position sets of REs that are used to send CSI RSs on eight antenna ports in an LTE R10 system. In this case, the resource element groups used by the two antenna port subsets in the two RB pairs do not have an intersection. In this case, for how an eNB instructs legacy UE and UE in an LTE R12 system or in a future system to receive a CSI RS and how the UE performs correct rate matching, so that in the reference signal configuration, an RE position occupied by a CSI RS in the LTE R10 system may be reused and interference to legacy UE in a same cell may be reduced, refer to the descriptions in step 102 in the foregoing embodiment, and details are not further described herein.

In addition, in a two-cell example, for how to instruct, in two cells, UE to use a reference signal configuration to receive CSI RSs, so as to effectively avoid pilot contamination and interference to a PDSCH caused by a CSI RS of a neighboring cell, refer to the descriptions in step 102 in the foregoing embodiment, and details are not further described herein.

Optionally, when a CP is a normal CP, a position of a resource element (RE) relative to an RB pair in which the resource element (RE) is located is represented by a triplet $(k',l',n_s \bmod 2)$. That each resource element group includes eight REs is used as an example. The resource element group set A includes two or more of the resource element groups represented by the expressions (1) to (5), where the resource element group set A may apply to a subframe type FS1 or FS2.

That each resource element group includes four REs is used as an example. The resource element group set A includes two or more of the resource element groups represented by the expressions (6) to (15), where the resource element group set A may apply to a subframe type FS1 or FS2.

That each resource element group includes eight REs is used as an example. The resource element group set A may further include two or more of the resource element groups represented by the expressions (16) to (18), where the resource element group set A may apply to a subframe type FS1.

That each resource element group includes four REs is used as an example. The resource element group set A may further include two or more of the resource element groups represented by the expressions (19) to (24), where the resource element group set A may apply to a subframe type FS1.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (25) to (27), where the resource element group set A may apply to a subframe type FS2.

That each resource element group includes four REs is used as an example. The resource element group set A includes two or more of the resource element groups represented by the expressions (28) to (33), where the resource element group set A may apply to a subframe type FS2.

For LTE special subframe configurations 1, 2, 6, and 7, that each resource element group includes eight REs is used as an example. The resource element group set A may further include two or more of the resource element groups represented by the expressions (34) to (36).

For LTE special subframe configurations 1, 2, 6, and 7, that each resource element group includes four REs is used as an example. The resource element group set A may further include two or more of the resource element groups represented by the expressions (37) to (42).

For LTE special subframe configurations 3, 4, 8, and 9, that each resource element group includes eight REs is used as an example. The resource element group set A may further include two or more of the resource element groups represented by the expressions (43) to (45).

For LTE special subframe configurations 3, 4, 8, and 9, that each resource element group includes four REs is used as an example. The resource element group set A may further include two or more of the resource element groups represented by the expressions (46) to (51).

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (52) to (55), where the resource element group set or the resource element group may apply to a subframe type FS1 or FS2.

That each resource element group includes four REs is used as an example. The resource element group set A includes two or more of the resource element groups represented by the expressions (56) to (63), where the resource element group set or the resource element group may apply to a subframe type FS1 or FS2.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (64) to (66), where the resource element group set or the resource element group may apply to a subframe type FS2.

That each resource element group includes four REs is used as an example. The resource element group set A includes two or more of the resource element groups represented by the expressions (67) to (72), where the resource element group set or the resource element group may apply to a subframe type FS2.

202: The base station determines, according to a reference signal configuration indicated by the reference signal configuration information, positions of resource elements (REs) that are used to send reference signals on antenna ports in an antenna port set corresponding to the reference signal configuration.

203: The base station sends the reference signals to the user equipment at the determined positions.

Compared with the prior art, in this embodiment of the present invention, a base station sends reference signal resource configuration information to user equipment, where the reference signal resource configuration information includes antenna port quantity information and a resource configuration index, and resource elements (REs) that are used to send reference signals on antenna ports in two antenna port subsets included in an antenna port set corresponding to a reference signal configuration indicated by the reference signal resource configuration information are located in two different resource block (RB) pairs; and the base station determines, according to the sent reference signal resource configuration information, positions of the resource elements (REs) that are used to send reference signals on the antenna ports in the antenna port set, and sends reference signals to the user equipment at the positions of the resource elements (RE). Therefore, a problem that prior-art reference signals do not support more than eight antenna ports can be resolved, and a feasible design solution for reference signal configuration is provided for an antenna configuration including more than eight antenna ports. In addition, resource element groups used by the two antenna port subsets in the two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement and improving a system throughput.

Figure 3:
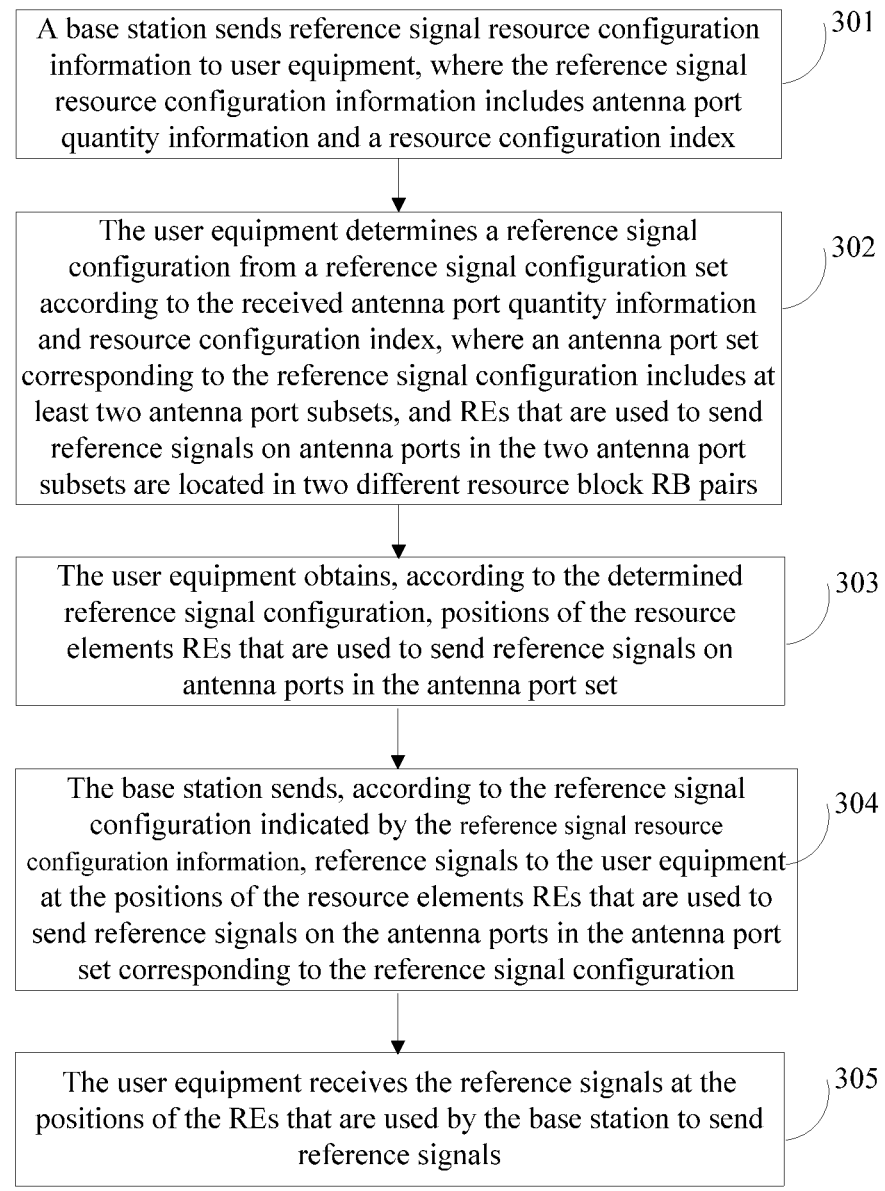
FIG. 3 is a flowchart of another method according to an embodiment.

Another embodiment provides a reference signal sending and receiving method. As shown in FIG. 3, the method includes the following steps.

301: A base station sends reference signal resource configuration information to user equipment, where the reference signal resource configuration information includes antenna port quantity information and a resource configuration index.

Specifically, the antenna port quantity information may be a quantity of antenna ports. For example, the quantity of antenna ports may be 8, 16, 32, 64, or the like. The antenna port quantity information may be structure information of an antenna port array. For example, the antenna port array is 2×8 (2 rows and 8 columns), 4×4 (4 rows and 4 columns), or 8×2 (8 rows and 2 columns); it may be obtained from the information that a quantity of antenna ports is 16. For another example, an antenna port array is 4×8 (4 rows and 8 columns), 2×16 (2 rows and 16 columns), or 8×4 (8 rows and 4 columns); it may be obtained from the information that a quantity of antenna ports is 32.

The resource configuration index is an index of a reference signal configuration corresponding to a specific quantity of antenna ports. After the quantity of antenna ports is determined, a reference signal configuration may be determined according to the resource configuration index.

302: The user equipment determines a reference signal configuration from a reference signal configuration set according to the received antenna port quantity information and resource configuration index, where an antenna port set corresponding to the reference signal configuration includes at least two antenna port subsets, and REs that are used to send reference signals on antenna ports in the two antenna port subsets are located in two different resource block (RB) pairs.

The reference signal configuration set includes at least one reference signal configuration, where the reference signal configuration is used to indicate position information of resource elements (REs) that are used to send reference signals on antenna ports in the antenna port set. The RB pairs in which the REs that are used to send reference signals on the antenna ports in the two antenna port subsets are located are separately located at different frequency domain positions in a same subframe or located in a same subband of different subframes.

The subband includes one or more consecutive RBs. Specifically, a size of the subband may be a size of a precoding resource block group (PRG). For example, depending on system bandwidth, the subband size or PRG size (measured in RB) may be:

| System bandwidth | Subband or PRG size |
| --- | --- |
| ≤10 | 1 |
| 11-26 | 2 |
| 27-63 | 3 |
| 64-110 | 2 |

The subband size may also be equal to a subband size reported in CSI. For example, the subband size may be:

| System bandwidth | Subband size |
| --- | --- |
| 6-7 | 1 |
| 8-10 | 2 |
| 11-26 | 2 |
| 27-63 | 3 |
| 64-110 | 4 |

| System bandwidth | Subband size |
| --- | --- |
| 6-7 | 2 |
| 8-10 | 4 |
| 11-26 | 4 |
| 27-63 | 6 |
| 64-110 | 8 |

Further, the resource element groups used by the two antenna port subsets in the two RB pairs are $REG_{i_1}$ and $REG_{i_2}$ respectively, where $REG_{i_1} \in A$, $REG_{i_2} \in A$, and $i_1 \neq i_2$; and the set is $A=\{REG_i | i=0, 1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs.

Each resource element group in the set A represents a set of position triplets $(k', l', n_s \bmod 2)$ of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s \bmod 2$ represents a computed value resulting from a modulo 2 operation on $n_s$. For example, in a radio frame, a value of $n_s$ ranges from 0 to 19; in each RB, a value of k' ranges from 0 to 11, and a value of l' ranges from 0 to 6.

Figure 3A:
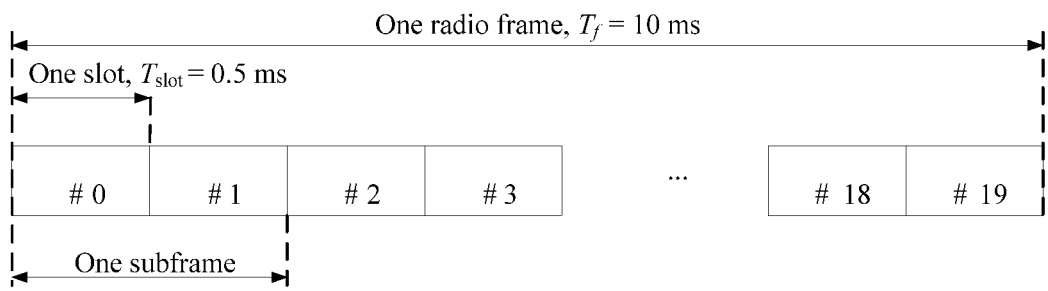
FIG. 3a is a schematic diagram of frame structure type 1 according to another embodiment.
Figure 3B:
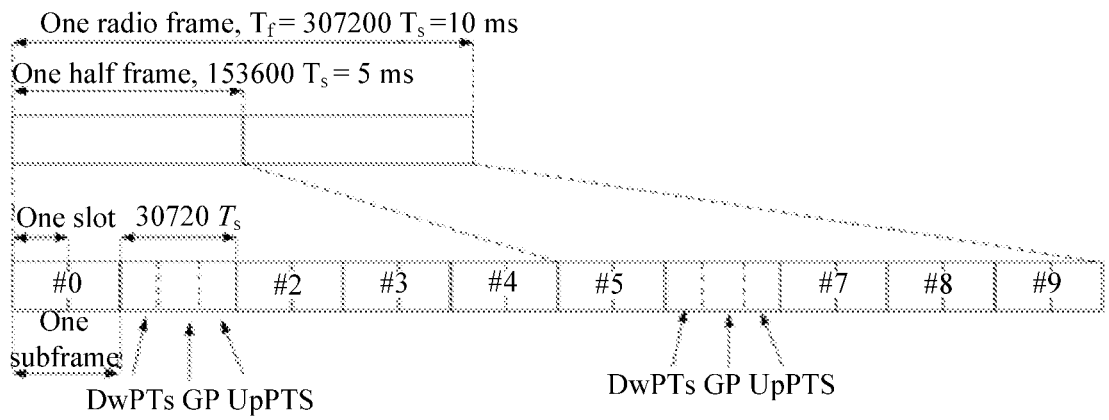
FIG. 3b is a schematic diagram of frame structure type 2 according to another embodiment.
Figure 3C:
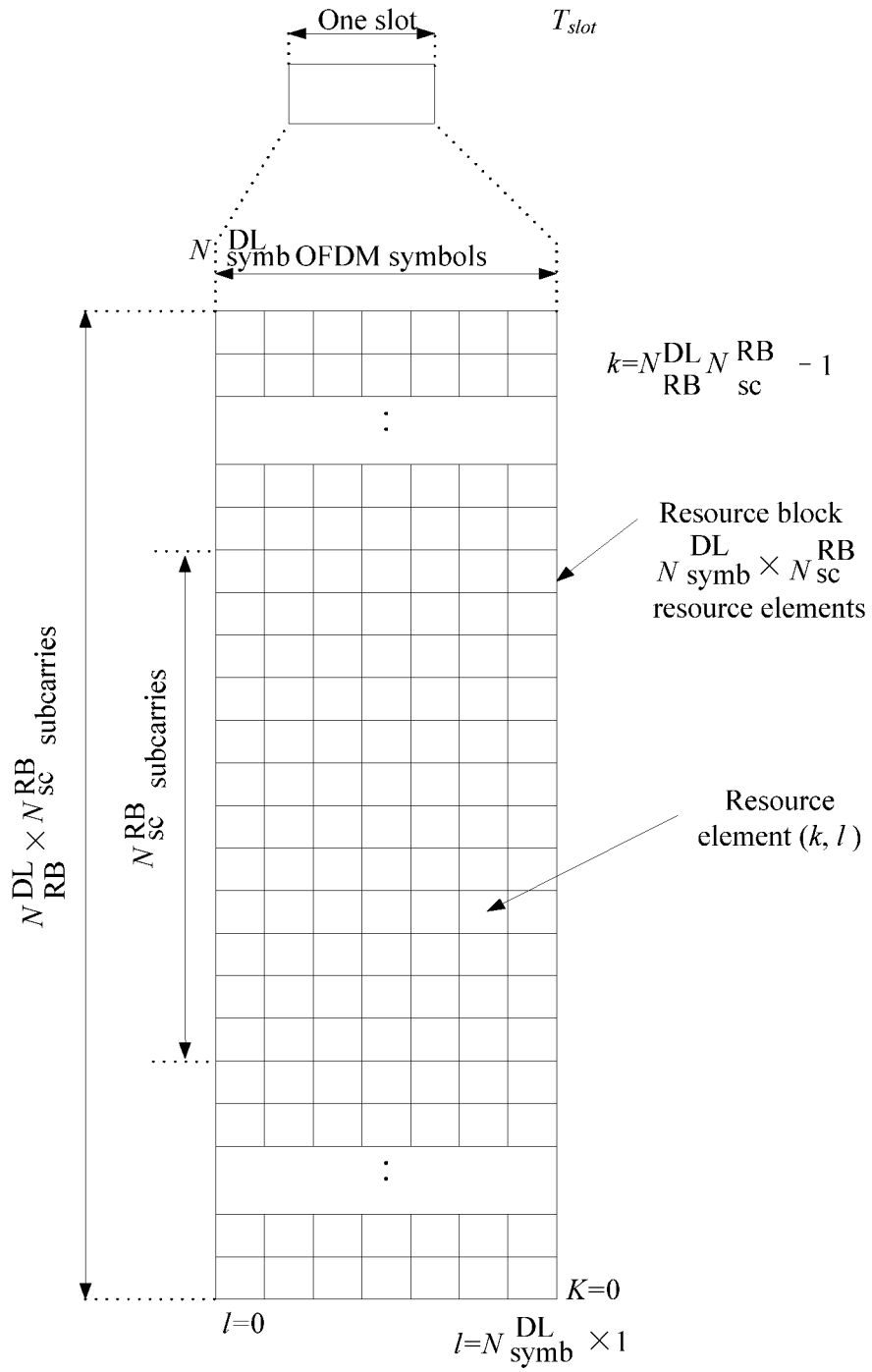
FIG. 3c is a schematic structural diagram of a timeslot according to another embodiment.

For ease of understanding, the following describes a frame structure, a timeslot structure, a physical resource element and a resource block (RB) with reference to FIG. 3a, FIG. 3b, and FIG. 3c. In a 3GPP LTE system, uplink and downlink transmission is organized into radio frames, where a length of each radio frame is 10 milliseconds, and each radio frame includes 10 subframes each with a length of 1 millisecond and includes 20 timeslots (slot) each with a length of 0.5 milliseconds, where timeslot numbers are from 0 to 19. One subframe is defined as two consecutive timeslots. Two types of frame structures, type 1 and type 2, are supported and are used in the FDD system and the TDD system respectively. Frame structure type 1 (FS1) and frame structure type 2 (FS2) are shown in FIG. 3a and FIG. 3b respectively.

A signal transmitted within each timeslot may be represented by one or more resource grids. With a downlink system used as an example, a structure of a resource grid including $N_{RB}^{DL} N_{sc}^{RB}$ subcarriers and $N_{symb}^{DL}$ OFDM symbols is shown in FIG. 3c, where $N_{RB}^{DL}$ is system bandwidth measured in resource blocks (RB), $N_{sc}^{RB}$ is a quantity of subcarriers in one RB, and $N_{symb}^{DL}$ is a quantity of OFDM symbols within one downlink timeslot. Each element in the resource grid is referred to as a resource element (RE), and each RE may be uniquely identified by using an index pair (k,l) within a timeslot, where $k=0, \ldots, N_{sc}^{RB}-1$ is an index of a frequency domain within the timeslot, and $l=0, \ldots, N_{symb}^{DL}-1$ is an index of a time domain within the timeslot. $N_{symb}^{DL}$ consecutive OFDM symbols in a time domain and $N_{sc}^{RB}$ consecutive subcarriers in a frequency domain are defined as one resource block (RB). For a physical RB, two types of configurations, normal cyclic prefix (CP) and extended CP, may be included, and a quantity of subcarriers and a quantity of OFDM symbols of the physical RB are shown in the following table, where $\Delta f$ is a subcarrier spacing.

| Configuration | | $N_{sc}^{RB}$ | $N_{symb}^{DL}$ |
| --- | --- | --- | --- |
| Normal CP | $\Delta f$ = 15 kHz | 12 | 7 |
| Extended CP | $\Delta f$ = 15 kHz | | 6 |
| | $\Delta f$ = 7.5 kHz | 24 | 3 |

A RB pair is defined as two RBs having a same RB number in one subframe. Obviously, timeslot numbers of two RBs in one RB pair are even and odd numbers respectively.

An antenna port is defined such that a channel over which a symbol on the antenna port is sent may be inferred from a channel over which another symbol on the same antenna port is sent. Each antenna port has one resource grid. In practice, each antenna port may be corresponding to a physical antenna, or may be corresponding to a virtual antenna, that is, a combination of multiple physical antennas.

Each antenna port uses one resource grid, and the base station sends a reference signal or a data channel in a time domain and a frequency domain that are corresponding to the resource grid. REs in the resource grid may be separately used to send a reference signal and a data channel such as a PDSCH. UE may estimate a channel between the UE and a corresponding antenna port by receiving the reference signal on the resource grid; according to the channel estimation value, the UE may perform channel state measurement on the channel between the UE and the corresponding antenna port or perform demodulation on the data channel.

The reference signal configuration set includes multiple reference signal configurations, where the reference signal configuration is used to indicate position information of resource elements (REs) that are used to send reference signals on antenna ports in an antenna port set. In a reference signal configuration, resource element groups used by two antenna port subsets may be obtained by performing, in an RB, cyclic shifting and/or interlacing on resource element groups used by two antenna port subsets in another reference signal configuration. For example, it is defined that an antenna port set corresponding to a first reference signal configuration includes at least two antenna port subsets: a first antenna port subset and a second antenna port subset, where resource element groups (REGs) used by the two antenna port subsets in a first RB pair and a second RB pair are $REG_{i_1}$ and $REG_{i_2}$ respectively, $i_1 \neq i_2$, and $i_1, i_2 \in \{0, 1, \ldots, M-1\}$, $M \geq 2$; and an antenna port set corresponding to a second reference signal configuration also includes at least the first antenna port subset and the second antenna port subset, where a resource element group used by the first antenna port subset in the first RB pair is $REG_{j_1}$, a resource element group used by the second antenna port subset in the second RB pair is $REG_{j_2}$, $j_1 \neq j_2$, and $j_1, j_2 \in \{0, 1, \ldots, M-1\}$, $M \geq 2$, where $REG_{i_1} \in A$, $REG_{i_2} \in A$, $REG_{j_1} \in A$, $REG_{j_2} \in A$, $A = \{REG_i | i = 0, 1, \ldots, M-1\}$, and $M \geq 2$. Based on the resource element groups used by the two antenna port subsets included in the first reference signal configuration, the resource element groups used by the two antenna port subsets included in the second reference signal configuration may be obtained by using the following relationship:

$j_1 = (i_1 + n) \mod M$, $j_2 = (i_2 + n) \mod M$, where $j_1 = (i_1 + n) \mod M$ indicates that $j_1$ is obtained by performing cyclic shifting on where a value of a shift is n, and $n \geq 1$; and $j_2 = (i_2 + n) \mod M$ indicates that $j_2$ is obtained by performing cyclic shifting on $i_2$, where a value of a shift is also n. The cyclic shift is corresponding to a sequence with a total length of M: 0, 1, 2, . . . , M−1. Correspondingly, the resource element groups $REG_{j_1}$ and $REG_{j_2}$ used by the two antenna port subsets included in the second reference signal configuration may be obtained by performing cyclic shifting relative to a resource element group sequence $REG_0$, $REG_1$, . . . , $REG_{M-1}$ by using the resource element groups $REG_{i_1}$ and $REG_{i_2}$ used by the two antenna port subsets included in the first reference signal configuration, where a length of the sequence is M, a shift is n resource element group positions, and $n \geq 1$.

Based on the resource element groups used by the two antenna port subsets included in the first reference signal configuration, the resource element groups used by the two antenna port subsets included in the second reference signal configuration may also be obtained by using the following relationship:

$j_1 = i_2$, $j_2 = i_1$, where:

$j_1 = i_2$ indicates $REG_{j_1} = REG_{i_2}$, in which case, a resource element group used by the first reference signal configuration in the first RB pair is the same as a resource element group used by the second reference signal configuration in the second RB pair; similarly, $j_2 = i_1$ indicates that a resource element group used by the first reference signal configuration in the second RB pair is the same as a resource element group used by the second reference signal configuration in the first RB pair. Therefore, $j_1 = i_2$, $j_2 = i_1$ both holding true is equivalent that interlacing is performed between the resource element groups used by the two antenna port subsets included in the first reference signal configuration on the two RB pairs and the resource element groups used by the two antenna port subsets included in the second reference signal configuration on the two RB pairs.

It should be noted that the foregoing method or relationships may be not limited to a scenario in which an antenna port set in a reference signal configuration includes two antenna port subsets, and may also be applicable to a scenario in which an antenna port set in a reference signal configuration includes three or more antenna port subsets. A relationship between resource element groups used in the reference signal configuration is not limited to cyclic shift or interlace either, and may further be a combination of cyclic shift and interlace. That the antenna port set in the reference signal configuration includes K antenna port subsets is used as an example. A resource element group $REG_{j_k}$, $k = 1, \ldots, K$ used by the K antenna port subsets included in the second reference signal configuration and a resource element group $REG_{i_k}$, $k = 1, \ldots, K$ used by the K antenna port subsets included in the first reference signal configuration meet the following relationship true:

$$j_k = (i_k + n) \bmod M, k = 1, 2, \ldots K, K \geq 2;$$

or $$j_k = \begin{cases} i_{k+\lfloor K/2 \rfloor}, & k = 1, 2, \ldots, \lfloor K/2 \rfloor \\ i_{k-\lfloor K/2 \rfloor}, & k = \lfloor K/2 \rfloor + 1, K \end{cases}, K \geq 2;$$

or $$j_k = \begin{cases} i_{k+\lceil K/2 \rceil}, & k = 1, 2, \ldots, \lceil K/2 \rceil \\ i_{k-\lceil K/2 \rceil}, & k = \lceil K/2 \rceil + 1, K \end{cases}, K \geq 2;$$

or $$j_k = \begin{cases} i_{k+\lfloor K_1/2 \rfloor}, & k = 1, 2, \ldots, \lfloor K_1/2 \rfloor \\ i_{k-\lfloor K_1/2 \rfloor}, & k = \lfloor K_1/2 \rfloor + 1, \ldots, K_1, \\ (i_k + n) \bmod M, & k = K_1 + 1, \ldots, K \end{cases}$$

$1 \leq K_1 \leq K, K \geq 2.$

Specifically, normal-CP and extended-CP reference signal configurations are separately described by using an example in which there are 16 antenna ports and in which two antenna port subsets of the 16 antenna ports are separately located in two neighboring RBs in a frequency domain. It is assumed that numbers of antenna ports in the antenna port subsets are x, x+1, . . . , and x+7 and x+8, x+9, . . . , and x+15 separately, where x is a start number, for example, may be x=15, which is not limited herein. For ease of understanding, descriptions are given with examples combining tables and drawings.

For the normal CP, resource elements used in reference signal configurations and a reference signal configuration set may be shown in Table 1.

TABLE 1

| Reference signal configuration | Quantity of antenna ports is 16 | | | |
|---|---|---|---|---|
| | Antenna port number: x to x + 7 | | Antenna port number: x + 8 to x + 15 | |
| | (k', l') | ($n_{RB}$ mod 2, $n_s$ mod 2) | (k', l') | ($n_{RB}$ mod 2, $n_s$ mod 2) |
| FS1 or FS2    c0 | (9, 5) | ($x_0$, 0) | (11, 2) | (1 − $x_1$, 1) |
| c1 | (11, 2) | ($x_1$, 1) | (9, 2) | (1 − $x_2$, 1) |
| c2 | (9, 2) | ($x_2$, 1) | (7, 2) | (1 − $x_3$, 1) |
| c3 | (7, 2) | ($x_3$, 1) | (9, 5) | (1 − $x_4$, 1) |
| c4 | (9, 5) | ($x_4$, 1) | (9, 5) | (1 − $x_0$, 0) |
| FS2    c20 | (11, 1) | ($x_{20}$, 1) | (9, 1) | (1 − $x_{21}$, 1) |
| c21 | (9, 1) | ($x_{21}$, 1) | (7, 1) | (1 − $x_{22}$, 1) |
| c22 | (7, 1) | ($x_{22}$, 1) | (11, 1) | (1 − $x_{20}$, 1) |

When a subframe type is FS1 or FS2, a reference signal configuration set includes five reference signal configurations c0 to c4; or when a subframe type is FS2, a reference signal configuration set includes three reference signal configurations c0 to c22, where c0 to c4 and c20 to c22 are resource configuration indexes, and specific values of c0 to c4 and c20 to c22 may be 0 to 4 and 20 to 22 respectively; c0 to c4 and c20 to c22 may be coded jointly or coded independently. Depending on specific coding, the specific values of c0 to c4 and c20 to c22 are not limited herein.

$n_{RB}$ represents an index of an RB pair in which the resource element is located, where $n_{RB}$ may be an RB number in a system, or may be an index of an RB number relative to a specified RB number. In the table, an index of an RB pair in which a first antenna port subset (including antenna port numbers x to x+7) is located is $n_{RB}$ mod 2=x0, ..., x4, or x20, ..., x22, and then an index of an RB pair in which a second antenna port subset (including antenna port numbers x+8 to x+15) is $n_{RB}$ mod 2= 1−x0, ..., 1−x4, or 1−x20, ..., 1−x22, where mod represents a modulo operation, $n_{RB}$ mod 2 represents a computed value resulting from a modulo 2 operation on $n_{RB}$, and values of x0, ..., x4, or x20, ..., x22 are 0 or 1.

Figure 4A:
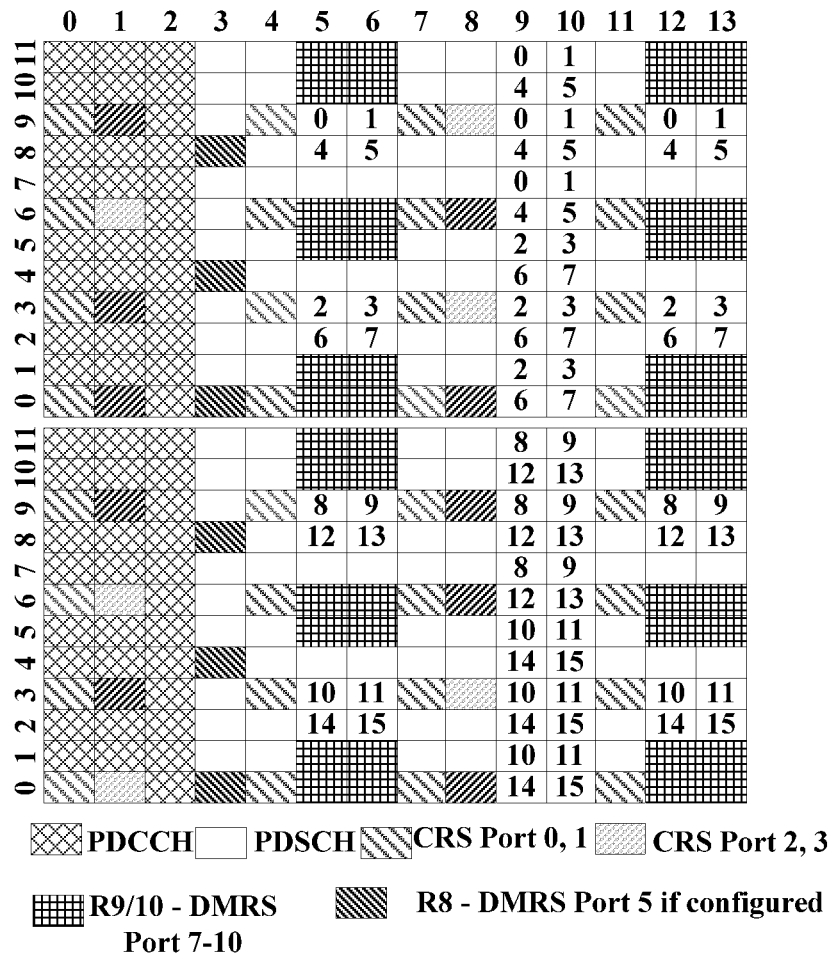
FIG. 4a and FIG. 4b are schematic diagrams of reference signal configurations according to another embodiment.
Figure 4B:
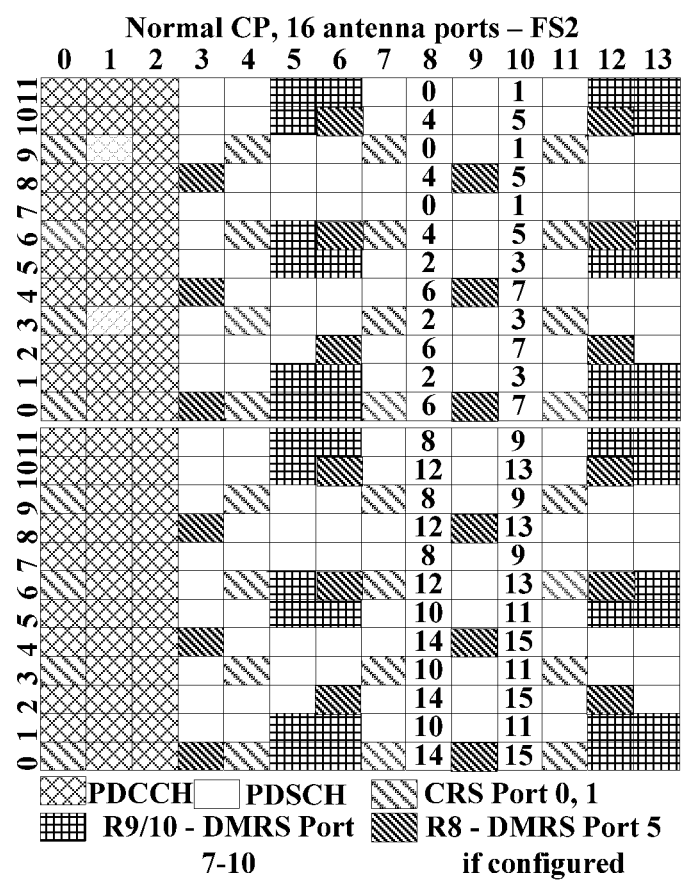

In the table, a value of a position, or triplet (k',l',$n_s$ mod 2), of the first RE (that is, the number 0 RE) in a resource element group used by each antenna port subset is given, where positions of other REs in each resource element group may be obtained based on the number 0 RE. In a same RB pair, specified offsets exist between other REs and the number 0 RE. Specifically, positions of REs in a resource element group are shown in FIG. 4a and FIG. 4b, where a horizontal direction represents a time domain and is measured in OFDM symbols, a vertical direction represents a frequency domain and is measured in subcarriers. An RB consisting of OFDM symbols 0 to 6 and 12 subcarriers is located in timeslot 0, an RB consisting of OFDM symbols 7 to 13 and 12 subcarriers is located in timeslot 1, and the two RBs have a same RB number and form an RB pair. Upper resource blocks are a first RB pair, and lower resource blocks are a second RB pair. REs marked by numbers 0 to 15 in the figures are positions of resource elements 0 to 15, where in each reference signal configuration, resource element groups used by two antenna port subsets occupy eight resource elements (RE) each.

When the subframe type is FS1 or FS2, in the first RB pair, resource element groups occupied in the reference signal configurations c0, c1, ..., and c4 are represented by the expressions (1) to (5) respectively; in the second RB pair, resource element groups occupied in the reference signal configurations c0, c1, ..., and c4 are represented by (2) to (5) and (1) respectively. Resource element groups (REGs) used by the two antenna port subsets in each reference signal configuration form an REG pair, which is represented by ($REG_k$,$REG_l$), and then REGs used by the two antenna port subsets in the reference signal configurations c0, c1, ..., and c4 are ($REG_0$,$REG_1$), ($REG_1$,$REG_2$), ($REG_2$,$REG_3$), ($REG_3$,$REG_4$), and ($REG_4$,$REG_0$) respectively, where $REG_i$, i=0, 1, ..., 4 are represented by (1) to (5) respectively. It should be noted that an REG pair used in any one of the reference signal configurations is a cyclic shift relative to an REG pair used in another reference signal configuration. For example, a shift of ($REG_1$,$REG_2$) relative to ($REG_0$,$REG_1$) is 1, and a shift of ($REG_4$,$REG_0$) relative to ($REG_0$,$REG_1$) is 4.

When the subframe type is FS2, in the first RB pair, resource element groups occupied in the reference signal configuration c20, c21, and c22 are represented by (25) to (27) respectively; in the second RB pair, resource element groups occupied in the reference signal configuration c20, c21, and c22 are represented by (26) to (27) and (25) respectively. That is, REGs used by the two antenna port subsets in the reference signal configurations c20, c21, and c22 are ($REG_0$,$REG_1$), ($REG_1$,$REG_2$), and ($REG_2$,$REG_0$) respectively, where $REG_i$, i=0, 1, 2 are represented by (25) to (27) respectively. It should be noted that an REG pair used in any one of the reference signal configurations is a cyclic shift relative to an REG pair used in another reference signal configuration. For example, a shift of ($REG_1$,$REG_2$) relative to ($REG_0$,$REG_1$) is 1, and a shift of ($REG_2$,$REG_0$) relative to ($REG_0$,$REG_1$) is 2.

Optionally, for the normal CP, resource elements used in reference signal configurations and a reference signal configuration set may also be shown in Table 2.

TABLE 2

| Reference signal configuration | Quantity of antenna ports is 16 | | | |
|---|---|---|---|---|
| | Antenna port number: x to x + 7 | | Antenna port number: x + 8 to x + 15 | |
| | (k', l') | ($n_{RB}$ mod 2, $n_s$ mod 2) | (k', l') | ($n_{RB}$ mod 2, $n_s$ mod 2) |
| FS1 or FS2    c0 | (9, 5) | ($x_0$, 0) | (9, 5) | (1 − $x_4$, 1) |
| c1 | (11, 2) | ($x_1$, 1) | (9, 2) | (1 − $x_2$, 1) |
| c2 | (9, 2) | ($x_2$, 1) | (7, 2) | (1 − $x_3$, 1) |
| c3 | (7, 2) | ($x_3$, 1) | (11, 2) | (1 − $x_1$, 1) |
| c4 | (9, 5) | ($x_4$, 1) | (9, 5) | (1 − $x_0$, 0) |
| FS2    c20 | (11, 1) | ($x_{20}$, 1) | (9, 1) | (1 − $x_{21}$, 1) |
| c21 | (9, 1) | ($x_{21}$, 1) | (7, 1) | (1 − $x_{22}$, 1) |
| c22 | (7, 1) | ($x_{22}$, 1) | (11, 1) | (1 − $x_{20}$, 1) |

Specific meanings of parameters in Table 2 are the same as or similar to those in Table 1, and are not described herein again. When a subframe type is FS1 or FS2, REGs used by two antenna port subsets in reference signal configurations c0, c1, ..., and c4 are ($REG_0$,$REG_4$), ($REG_1$,$REG_2$), ($REG_2$,$REG_3$), ($REG_3$,$REG_1$), and ($REG_4$,$REG_0$) respectively, where $REG_i$, i=0, 1, ..., 4 are represented by (1) to (5) respectively. It should be noted that the REGs used in the reference signal configurations c0 and c4 are interlaced with each other, and the REGs used in the reference signal configurations c1, c2, and c3 are cyclic shifts of each other.

When a subframe type is FS2, REGs used by two antenna port subsets in reference signal configurations c2, c21, and c22 are ($REG_0$,$REG_1$), ($REG_1$,$REG_2$), and ($REG_2$,$REG_0$) respectively, where $REG_i$, i=0, 1, 2 are represented by (25)

to (27) respectively. It should be noted that the REGs used in the reference signal configurations c20, c2, and c22 are cyclic shifts of each other.

Optionally, for the normal CP, resource elements used in reference signal configurations and a reference signal configuration set may also be shown in Table 3.

TABLE 3

| | | Quantity of antenna ports is 16 | | |
|---|---|---|---|---|
| | | Antenna port number: x to x + 7 | | Antenna port number: x + 8 to x + 15 |
| Reference signal configuration | (k', l') | ($n_{RB}$ mod 2, $n_s$ mod 2) | (k', l') | ($n_{RB}$ mod 2, $n_s$ mod 2) |
| FS1 or FS2 | c0 | (9, 5) | ($x_0$, 0) | (9, 5) | (1 − $x_4$, 1) |
| | c1 | (11, 2) | ($x_1$, 1) | (7, 2) | (1 − $x_3$, 1) |
| | c2 | (9, 2) | ($x_2$, 1) | (11, 2) | (1 − $x_1$, 1) |
| | c3 | (7, 2) | ($x_3$, 1) | (9, 2) | (1 − $x_2$, 1) |
| | c4 | (9, 5) | ($x_4$, 1) | (9, 5) | (1 − $x_0$, 0) |
| FS2 | c20 | (11, 1) | ($x_{20}$, 1) | (7, 1) | (1 − $x_{22}$, 1) |
| | c21 | (9, 1) | ($x_{21}$, 1) | (11, 1) | (1 − $x_{20}$, 1) |
| | c22 | (7, 1) | ($x_{22}$, 1) | (9, 1) | (1 − $x_{21}$, 1) |

Specific meanings of parameters in Table 3 are the same as or similar to those in Table 1, and are not described herein again. When a subframe type is FS1 or FS2, REGs used by two antenna port subsets in reference signal configurations c0, c1, . . . , and c4 are ($REG_0$,$REG_4$), ($REG_1$,$REG_3$), ($REG_2$,$REG_1$), ($REG_3$,$REG_2$), and ($REG_4$,$REG_0$) respectively, where $REG_i$, i=0, 1, . . . , 4 are represented by (1) to (5).It should be noted that REGs used in the reference signal configurations c0 and c4 are interlaced with each other, and the REGs used in the reference signal configurations c1, c2, and c3 are cyclic shifts of each other.

When a subframe type is FS2, REGs used by two antenna port subsets in reference signal configurations c20, c21, and c22 are ($REG_0$,$REG_2$), ($REG_1$,$REG_0$), and ($REG_2$,$REG_1$) respectively, where $REG_i$, i=0, 1, 2 are represented by (25) to (27) respectively. It should be noted that the REGs used in the reference signal configurations c20, c21, and c22 are cyclic shifts of each other.

Optionally, for the extended CP, resource elements used in reference signal configurations and a reference signal configuration set may also be shown in Table 4.

TABLE 4

| | | Quantity of antenna ports is 16 | | | |
|---|---|---|---|---|---|
| | | Antenna port number: x to x + 7 | | Antenna port number: x + 8 to x + 15 | |
| Reference signal configuration | (k', l') | ($n_{RB}$ mod 2, $n_s$ mod 2) | (k', l') | ($n_{RB}$ mod 2, $n_s$ mod 2) | |
| FS1 or FS2 | c0 | (11, 4) | ($x_0$, 0) | (9, 4) | (1 − $x_1$, 0) |
| | c1 | (9, 4) | ($x_1$, 0) | (10, 4) | (1 − $x_2$, 1) |
| | c2 | (10, 4) | ($x_2$, 1) | (9, 4) | (1 − $x_3$, 1) |
| | c3 | (9, 4) | ($x_3$, 1) | (11, 4) | (1 − $x_0$, 0) |
| FS2 | c16 | (11, 1) | ($x_{16}$, 1) | (10, 1) | (1 − $x_{17}$, 1) |
| | c17 | (10, 1) | ($x_{17}$, 1) | (9, 1) | (1 − $x_{18}$, 1) |
| | c18 | (9, 1) | ($x_{18}$, 1) | (11, 1) | (1 − $x_{16}$, 1) |

When a subframe type is FS1 or FS2, a reference signal configuration set includes four reference signal configurations c0 to c3; when a subframe type is FS2, a reference signal configuration set includes three reference signal configurations c6 to c8,where c0 to c3 and c16 to c18 are resource configuration indexes, and specific values of c0 to c3 and c16 to c18 may be 0 to 3 and 16 to 18 respectively; c0 to c3 and c6 to c8 may be coded jointly or coded independently. Depending on specific coding, the specific values of c0 to c3 and c16 to c18 are not limited herein.

$n_{RB}$ represents an index of an RB pair in which the resource element is located, where $n_{RB}$ may be an RB number in a system, or may be an index of an RB number relative to a specified RB number. In the table, an index of an RB pair in which a first antenna port subset (including antenna port numbers x to x+7) is located is $n_{RB}$ mod 2=x0, . . . , x3, or x16, . . . , x18, and then an index of an RB pair in which a first antenna port subset (including antenna port numbers x to x+7) is $n_{RB}$ mod 2=1−x0, . . . , 1−x3, or 1−x16, . . . , 1−x18. Values of x0, . . . , x3, or x16, . . . , x18 are 0 or 1.

Figure 5A:
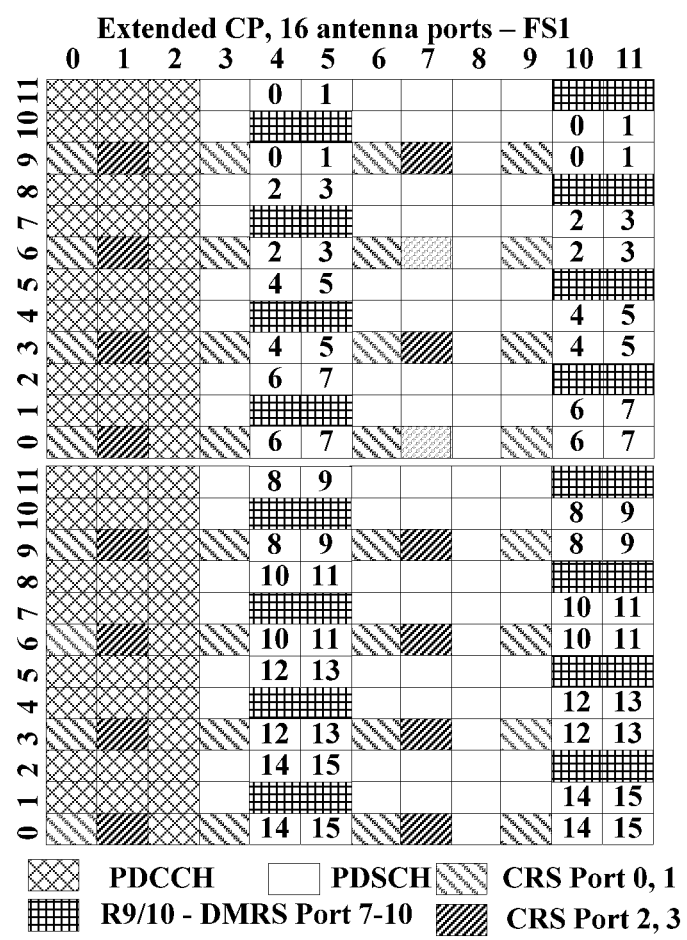
FIG. 5a and FIG. 5b are schematic diagrams of reference signal configurations in another case according to another embodiment.
Figure 5B:
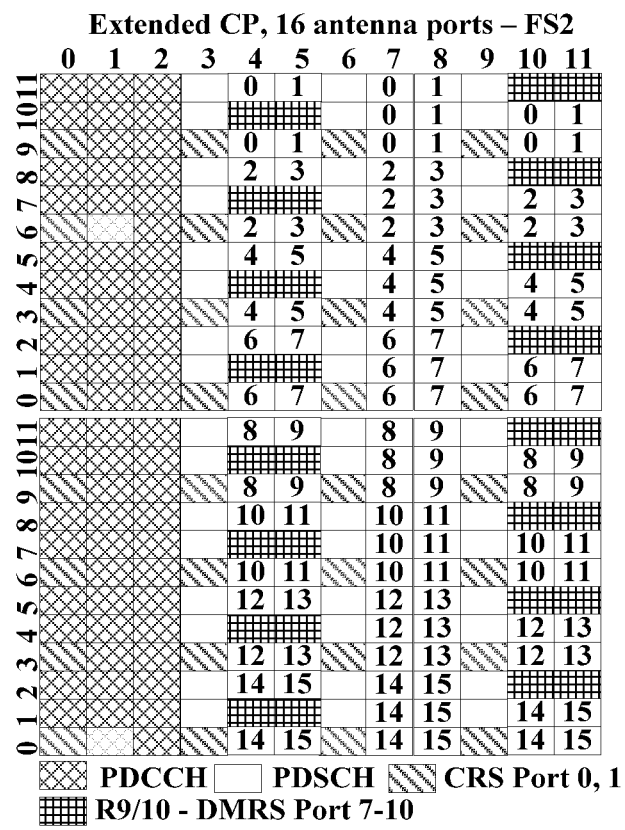

In the table, a value of a position, or triplet (k',l',$n_s$ mod 2), of a first RE (that is, the number 0 RE) in a resource element group used by each antenna port subset is given, where positions of other REs in each resource element group may be obtained based on the number 0 RE. In a same RB pair, specified offsets exist between other REs and the number 0 RE. Specifically, positions of REs in a resource element group are shown in FIG. 5a and FIG. 5b. An RB consisting of OFDM symbols 0 to 5 and 12 subcarriers is located in timeslot 0, an RB consisting of OFDM symbols 6 to 11 and 12 subcarriers is located in timeslot 1, and the two RBs have a same RB number and form an RB pair. Upper resource blocks are a first RB pair, and lower resource blocks are a second RB pair. REs marked by numbers 0 to 15 in the figures are positions of resource elements 0 to 15, where in each reference signal configuration, resource element groups used by two antenna port subsets occupy eight resource elements (RE) each.

When the subframe type is FS1 or FS2, in the first RB pair, resource element groups occupied in the configurations c0, c1, c2, and c3 are represented by (52) to (55) respectively; in the second RB pair, resource element groups occupied in the configurations c0, c1, c2, and c3 are represented by (53) to (55) and (52) respectively. Resource element groups (REGs) used by the two antenna port subsets in each reference signal configuration form an REG pair, which is represented by ($REG_k$,$REG_l$), and then REGs used by the two antenna port subsets in the reference signal configurations c0, c1, . . . , and c3 are ($REG_0$,$REG_1$), ($REG_1$,$REG_2$), ($REG_2$,$REG_3$), and ($REG_3$,$REG_0$) respectively, where $REG_i$, i=0, 1, . . . , 3 are represented by (52) to (55) respectively. It should be noted that the REGs used in the reference signal configurations c0 to c3 are cyclic shifts of each other.

When the subframe type is FS2, in the first RB pair, resource element groups occupied in the configurations c16, c17, and c18 are represented by (64), (65), and (66) respectively; in the second RB pair, resource element groups occupied in the configurations c16, c17, and c18 are represented by (65), (66), and (64) respectively. REGs used by the two antenna port subsets in the reference signal configurations c16, c17, and c18 are ($REG_0$,$REG_1$), ($REG_1$,$REG_2$), and ($REG_2$,$REG_0$) respectively, where $REG_i$, i=0, 1, 2 are represented by (64) to (66) respectively. It should be noted that the REGs used in the reference signal configurations c16 to c18 are cyclic shifts of each other.

Optionally, for the extended CP, resource elements used in reference signal configurations and a reference signal configuration set may also be shown in Table 5.

TABLE 5

| | | Quantity of antenna ports is 16 | | | |
|---|---|---|---|---|---|
| | Reference | Antenna port number: x to x + 7 | | Antenna port number: x + 8 to x + 15 | |
| | signal configuration | (k', l') | ($n_{RB}$ mod 2, $n_s$ mod 2) | (k', l') | ($n_{RB}$ mod 2, $n_s$ mod 2) |
| FS1 or FS2 | c0 | (11, 4) | ($x_0$, 0) | (10, 4) | (1 − $x_2$, 0) |
| | c1 | (9, 4) | ($x_1$, 0) | (9, 4) | (1 − $x_3$, 1) |
| | c2 | (10, 4) | ($x_2$, 1) | (11, 4) | (1 − $x_0$, 1) |
| | c3 | (9, 4) | ($x_3$, 1) | (9, 4) | (1 − $x_1$, 0) |
| FS2 | c16 | (11, 1) | ($x_{16}$, 1) | (10, 1) | (1 − $x_{17}$, 1) |
| | c17 | (10, 1) | ($x_{17}$, 1) | (9, 1) | (1 − $x_{18}$, 1) |
| | c18 | (9, 1) | ($x_{18}$, 1) | (11, 1) | (1 − $x_{16}$, 1) |

Specific meanings of parameters in Table 5 are the same as or similar to those in Table 4, and are not described herein again. When a subframe type is FS1 or FS2, REGs used by two antenna port subsets in reference signal configurations c0, c1, . . . , and c3 are ($REG_0$, $REG_2$), ($REG_1$, $REG_3$), ($REG_2$, $REG_0$), and ($REG_3$, $REG_1$) respectively, where $REG_i$, i=0, 1, . . . , 3 are represented by (52) to (55) respectively. It should be noted that the REGs used in the reference signal configurations c0 to c3 are cyclic shifts of each other.

When a subframe type is FS2, REGs used by two antenna port subsets in reference signal configurations c16, c17, and c18 are ($REG_0$, $REG_1$), ($REG_1$, $REG_2$), and ($REG_2$, $REG_0$) respectively, where $REG_i$, i=0, 1, 2 are represented by (64) to (66) respectively. It should be noted that the REGs used in the reference signal configurations c16 to c18 are cyclic shifts of each other.

Optionally, for the extended CP, resource elements used in reference signal configurations and a reference signal configuration set may also be shown in Table 6.

TABLE 6

| | | Quantity of antenna ports is 16 | | | |
|---|---|---|---|---|---|
| | Reference | Antenna port number: x to x + 7 | | Antenna port number: x + 8 to x + 15 | |
| | signal configuration | (k', l') | ($n_{RB}$ mod 2, $n_s$ mod 2) | (k', l') | ($n_{RB}$ mod 2, $n_s$ mod 2) |
| FS1 or FS2 | c0 | (11, 4) | ($x_0$, 0) | (10, 4) | (1 − $x_2$, 0) |
| | c1 | (9, 4) | ($x_1$, 0) | (9, 4) | (1 − $x_3$, 1) |
| | c2 | (10, 4) | ($x_2$, 1) | (11, 4) | (1 − $x_0$, 1) |
| | c3 | (9, 4) | ($x_3$, 1) | (9, 4) | (1 − $x_1$, 0) |
| FS2 | c16 | (11, 1) | ($x_{16}$, 1) | (9, 1) | (1 − $x_{18}$, 1) |
| | c17 | (10, 1) | ($x_{17}$, 1) | (11, 1) | (1 − $x_{16}$, 1) |
| | c18 | (9, 1) | ($x_{18}$, 1) | (10, 1) | (1 − $x_{17}$, 1) |

Specific meanings of parameters in Table 6 are the same as or similar to those in Table 4, and are not described herein again. When a subframe type is FS1 or FS2, REGs used by two antenna port subsets in reference signal configurations c0, c1, . . . , and c3 are ($REG_0$, $REG_2$), ($REG_1$, $REG_3$), ($REG_2$, $REG_0$), and ($REG_3$, $REG_1$) respectively, where $REG_i$, i=0, 1, . . . , 3 are represented by (52) to (55) respectively. It should be noted that the REGs used in the reference signal configurations c0 and c2 are interlaced with each other, and the REGs used in the reference signal configurations c1 and c3 are cyclic shifts of each other.

When a subframe type is FS2, REGs used by two antenna port subsets in reference signal configurations c16, c17, and c18 are ($REG_0$, $REG_2$), ($REG_1$, $REG_0$), and ($REG_2$, $REG_1$) respectively, where $REG_i$, i=0, 1, 2 are represented by (64) to (66) respectively. It should be noted that the REGs used in the reference signal configurations c16 to c18 are cyclic shifts of each other.

Optionally, for the extended CP, resource elements used in reference signal configurations and a reference signal configuration set may also be shown in Table 7.

TABLE 7

| | | Quantity of antenna ports is 16 | | | |
|---|---|---|---|---|---|
| | Reference | Antenna port number: x to x + 7 | | Antenna port number: x + 8 to x + 15 | |
| | signal configuration | (k', l') | ($n_{RB}$ mod 2, $n_s$ mod 2) | (k', l') | ($n_{RB}$ mod 2, $n_s$ mod 2) |
| FS1 or FS2 | c0 | (11, 4) | ($x_0$, 0) | (9, 4) | (1 − $x_1$, 0) |
| | c1 | (9, 4) | ($x_1$, 0) | (11, 4) | (1 − $x_0$, 1) |
| | c2 | (10, 4) | ($x_2$, 1) | (9, 4) | (1 − $x_3$, 1) |
| | c3 | (9, 4) | ($x_3$, 1) | (10, 4) | (1 − $x_2$, 0) |
| FS2 | c16 | (11, 1) | ($x_{16}$, 1) | (9, 1) | (1 − $x_{18}$, 1) |
| | c17 | (10, 1) | ($x_{17}$, 1) | (11, 1) | (1 − $x_{16}$, 1) |
| | c18 | (9, 1) | ($x_{18}$, 1) | (10, 1) | (1 − $x_{17}$, 1) |

Specific meanings of parameters in Table 7 are the same as or similar to those in Table 4, and are not described herein again. When a subframe type is FS1 or FS2, REGs used by two antenna port subsets in reference signal configurations c0, c1, . . . , and c3 are ($REG_0$, $REG_1$), ($REG_1$, $REG_0$), ($REG_2$, $REG_3$), and ($REG_3$, $REG_2$) respectively, where $REG_i$, i=0, 1, . . . , 3 are represented by (52) to (55) respectively. It should be noted that the REGs used in the reference signal configurations c0 and c1 are interlaced with each other, and the REGs used in the reference signal configurations c2 and c3 are cyclic shifts of each other.

When a subframe type is FS2, REGs used by two antenna port subsets in reference signal configurations c16, c17, and c18 are ($REG_0$, $REG_2$), ($REG_1$, $REG_0$), and ($REG_2$, $REG_1$) respectively, where $REG_i$, i=0, 1, 2 are represented by (64) to (66) respectively. It should be noted that the REGs used in the reference signal configurations c16 to c18 are cyclic shifts of each other.

303: The user equipment obtains, according to the determined reference signal configuration, positions of the resource elements (REs) that are used to send reference signals on the antenna ports in the antenna port set.

304: The base station sends, according to the reference signal configuration indicated by the sent reference signal resource configuration information, reference signals to the user equipment at the positions of the resource elements (REs) that are used to send reference signals on the antenna ports in the antenna port set corresponding to the reference signal configuration.

305: The user equipment receives the reference signals at the positions of the REs that are used by the base station to send the reference signals.

It should be noted that a channel state information-reference signal (CSI RS) is used as an example of the reference signal used in the reference signal transmission method described in this embodiment, and this embodiment imposes no limitation on a specific type of the used reference signal. For other types of reference signals, such as DMRS and CRS, a corresponding reference signal configuration or reference signal pattern may also be obtained by using the method described in this embodiment, where the reference signal configuration or the reference signal pattern includes at least two antenna port subsets, and resource element groups used by the antenna port subsets in different RB pairs do not have an intersection; further, a resource element group used in one reference signal configuration or reference signal pattern is obtained by performing cyclic shifting or interlacing on a resource element group used in another reference signal configuration or reference signal pattern.

With the DMRS as an example, there are 16 antenna ports, where two antenna port subsets are included, and each antenna port subset includes eight antenna ports.

For a frame structure type FS1, a method similar to that in the foregoing embodiment including a CSI RS is used, and a resource element group used by each antenna port subset in a reference signal configuration or reference signal pattern of the DMRS may be obtained based on a resource element group set A. For example, the resource element group set is A={REG$_i$|i=0, 1,2}, where:

REG$_0$={(11,5,0),(11,6,0),(11,5,1),(11,6,1),(10,5,0), (10,6,0),(10,5,1),(10,6,1)};

REG$_1$={(6,5,0),(6,6,0),(6,5,1),(6,6,1),(5,5,0),(5,6,0), (5,5,1),(5,6,1)}; and

REG$_2$={(1,5,0),(1,6,0),(1,5,1),(1,6,1),(0,5,0),(0,6,0), (0,5,1),(0,6,1)}.

For another example, for a frame structure type FS2, for LTE special subframe configurations 1, 2, 6, and 7, a resource element group used by each antenna port subset in a reference signal configuration or reference signal pattern of the DMRS may be obtained based on the following resource element group set A: resource element group set A={REG$_i$|i=0,1,2}, where:

REG$_0$={(11,2,0),(11,3,0),(11,5,0),(11,6,0),(10,2,0), (10,3,0),(10,5,0),(10,6,0)};

REG$_1$={(6,2,0),(6,3,0),(6,5,0),(6,6,0),(5,2,0),(5,3,0), (5,5,0),(5,6,0)}; and

REG$_2$={(1,2,0),(1,3,0),(1,5,0),(1,6,0),(0,2,0),(0,3,0), (0,5,0),(0,6,0)}.

For LTE special subframe configurations 3, 4, 8, and 9, a resource element group used by each antenna port subset in a reference signal configuration or reference signal pattern of the DMRS may be obtained based on the following resource element group set A: resource element group set A={REG$_i$|i=0,1,2}, where:

REG$_0$={(11,2,0),(11,3,0),(11,2,1),(11,3,1),(10,2,0), (10,3,0),(10,2,1),(10,3,1)};

REG$_1$={(6,2,0),(6,3,0),(6,2,1),(6,3,1),(5,2,0),(5,3,0), (5,2,1),(5,3,1)}; and

REG$_1$={(1,2,0),(1,3,0),(1,2,1),(1,3,1),(0,2,0),(0,3,0), (0,2,1),(0,3,1)}.

For a process of obtaining, based on the foregoing resource element group set A, a reference signal configuration or reference signal pattern of each DMRS, details are not described herein again.

It should be further noted that the foregoing described RB or RB pair and the RBs in Table 1 to Table 7 may be located in a same subframe or timeslot, or may be located in different subframes or timeslots, or different combinations of subframes or timeslots and subbands.

In addition, it needs to be further pointed out that one antenna port in the antenna port subset may use one resource element in the resource element group. With an antenna port subset consisting of eight antenna ports x to x+7 as an example, assuming that a resource element group used by the antenna port subset consist of eight resource elements (RE), RE0 to RE7, REs used to send reference signals on the antenna ports x, x+1, . . . , and x+7 may be RE0, RE1, RE2, . . . , and RE7 respectively.

In addition, on different antenna ports in an antenna port subset, multiple resource elements in a resource element group used by the antenna port subset may be used to send a reference signal in a code division multiplexing (CDM) manner. In the example of the antenna port subset consisting of eight antenna ports x to x+7, assuming that a resource element group used by the antenna port subset includes eight resource elements (RE), RE0 to RE7, REs used to send a reference signal on the antenna port x are RE0 and RE1, and REs used to send a reference signal on the antenna port x+1 are also RE0 and RE1. RE0 and the RE1 are used on the two reference signals in a code division multiplexing CDM manner; for example, codes [1, 1] and [1, −1] are respectively used on the two reference signals. Similarly, RE2 and RE3 may be used on x+2 and x+3 in a code division multiplexing CDM manner; . . . ; and RE6 and RE7 may be used on x+6 and x+7 in a code division multiplexing CDM manner. For another example, RE0, RE1, RE2, and RE3 may be used on the antenna ports x to x+3 in a code division multiplexing CDM manner, and RE4, RE5, RE6, and RE7 may be used on the antenna ports x+4 to x+7 in a code division multiplexing CDM manner, where codes used to transmit reference signals on the antenna ports x to x+3 or x+4 to x+7 may be [1,1,1,1], [1,−1,1,−1], [1,1,−1,−1], and [1,−1,−1, 1]. That multiple resource elements are used to transmit and receive a reference signal or data in a code division multiplexing CDM manner is a prior-art technology, and details are not described herein again.

Compared with the prior art, in this embodiment, a base station sends reference signal resource configuration information to user equipment, where the reference signal resource configuration information includes antenna port quantity information and a resource configuration index; the user equipment determines a reference signal configuration from a reference signal configuration set according to the received antenna port quantity information and resource configuration index, where REs that are used to send reference signals on antenna ports in two antenna port subsets included in an antenna port set corresponding to the reference signal configuration are located in two different resource block (RB) pairs; the user equipment obtains, according to the determined reference signal configuration, positions of the resource elements (REs) that are used to send reference signals on the antenna ports in the antenna port set; the base station sends the reference signals at the positions of the resource elements (REs); and the user equipment receives, according to the positions of the REs, the reference signals sent by the base station. Therefore, a problem that prior-art reference signals do not support more than eight antenna ports can be resolved, and a feasible design solution for reference signal configuration is provided for an antenna configuration including more than eight antenna ports. In addition, resource element groups used by two antenna port subsets in two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement and data demodulation and improving a system throughput.

Figure 6:
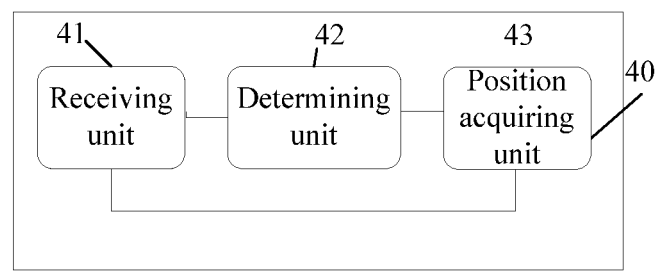
FIG. 6 is a schematic structural diagram of an apparatus according to another embodiment.

Another embodiment provides user equipment 40. As shown in FIG. 6, the user equipment 40 includes: a receiving unit 41, configured to receive reference signal resource configuration information sent by a base station, where the reference signal resource configuration information includes antenna port quantity information and a resource configuration index. The user equipment 40 also includes a determining unit 42, configured to determine a reference signal configuration from a reference signal configuration set according to the antenna port quantity information and the resource configuration index that are received by the receiving unit 41, where the reference signal configuration is used to indicate position information of resource elements (REs) that are used to send reference signals on antenna ports in an antenna port set, the reference signal configuration set includes at least one first reference signal configuration, and an antenna port set corresponding to the first reference signal configuration includes at least two antenna port subsets, where an RE that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair. The user equipment 40 also includes a position acquiring unit 43, configured to obtain, according to the reference signal configuration determined by the determining unit 42, positions of the resource elements (REs) that are used to send reference signals on the antenna ports in the antenna port set. The receiving unit 41 is further configured to receive the reference signals according to the positions of the REs obtained by the position acquiring unit 43.

The first RB pair and the second RB pair are separately located at different frequency domain positions in a same subframe or located in a same subband of different subframes.

A resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A=\{REG_i | i=0,1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs respectively; and each resource element group in the set A represents a set of position triplets (k',l', $n_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s$ mod 2 represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0,1, \ldots, M-1\}$, and $i_1$, $i_2$, $j_1$ and $j_2$ meet at least one of the following relationships: $j_1=(i_1+n)$ mod M, $j_2=(i_2+n)$ mod M, and $j_1=i_2$, $j_2=i_1$, where n represents a shift whose value is an integer.

Specifically, different resource element groups in the set A may be different position sets of REs that are used to send CSI RSs on eight antenna ports in an LTE R10 system. In this case, the resource element groups used by the two antenna port subsets in the two RB pairs do not have an intersection. In this case, for how an eNB instructs legacy UE and UE in an LTE R12 system or in a future system to receive a CSI RS and how the UE performs correct rate matching, so that in the reference signal configuration, an RE position occupied by a CSI RS in the LTE R10 system may be reused and interference to legacy UE in a same cell may be reduced, refer to the descriptions in step 102 in the foregoing embodiment, and details are not further described herein.

In addition, in a two-cell example, for how to instruct, in two cells, UE to use a reference signal configuration to receive CSI RSs, so as to effectively avoid pilot contamination and interference to a PDSCH caused by a CSI RS of a neighboring cell, refer to the descriptions in step 102 in the foregoing embodiment, and details are not further described herein.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (1) to (5), where the resource element group set A or the resource element group may apply to a subframe type FS1 or FS2.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (25) to (27), where the resource element group set A may apply to a subframe type FS2.

For LTE special subframe configurations 1, 2, 6, and 7, that each resource element group includes eight REs is used as an example. The resource element group set A may further include two or more of the resource element groups represented by the expressions (34) to (36).

For LTE special subframe configurations 3, 4, 8, and 9, that each resource element group includes eight REs is used as an example. The resource element group set A may further include two or more of the resource element groups represented by the expressions (43) to (45).

Optionally, for the normal CP, a resource element group used in the reference signal configuration and a reference signal configuration set may be shown in Table 1, Table 2, or Table 3 in the foregoing embodiment. For related descriptions, refer to the foregoing embodiment, and details are not further described herein.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (52) to (55), where the resource element group set or the resource element group applies to a subframe type FS1 or FS2.

Optionally, when a cyclic prefix (CP) is an extended CP, a position of a resource element (RE) relative to an RB pair in which the resource element (RE) is located is represented by a triplet (k',l',n$_s$ mod 2) That each resource element group includes eight REs is used as an example. The resource element group set A includes two or more of the resource element groups represented by the expressions (64) to (66), where the resource element group set or the resource element group may apply to a subframe type FS2.

Optionally, for the extended CP, a resource element group used in the reference signal configuration and a reference signal configuration set may be shown in Table 4, Table 5, Table 6, or Table 7 in the foregoing embodiment. For related descriptions, refer to the foregoing embodiment, and details are not further described herein.

Compared with the prior art, in this embodiment, user equipment 40 receives reference signal resource configuration information sent by a base station, where the reference signal resource configuration information includes antenna port quantity information and a resource configuration index; the user equipment 40 determines a reference signal configuration from a reference signal configuration set according to the received antenna port quantity information and resource configuration index, where REs that are used to send reference signals on antenna ports in two antenna port subsets included in an antenna port set corresponding to the reference signal configuration are located in two different resource block (RB) pairs; and the user equipment 40 obtains, according to the determined reference signal configuration, positions of the resource elements (REs) that are used to send reference signals on the antenna ports in the antenna port set, and receives, according to the positions of the REs, the reference signals sent by the base station. Therefore, a problem that prior-art reference signals do not support more than eight antenna ports can be resolved, and a feasible design solution for reference signal configuration is provided for an antenna configuration including more than eight antenna ports. In addition, resource element groups used by the two antenna port subsets in the two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement and improving a system throughput.

Figure 7:
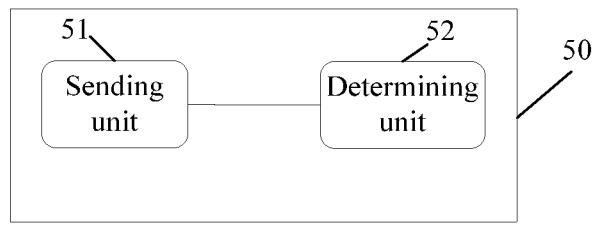
FIG. 7 is a schematic structural diagram of an apparatus according to another embodiment.

Another embodiment provides a base station 50. As shown in FIG. 7, the base station 50 includes: a sending unit 51, configured to send reference signal resource configuration information to user equipment, where the reference signal resource configuration information includes antenna port quantity information and a resource configuration index, and the antenna port quantity information and the resource configuration index are used to indicate a reference signal configuration in a reference signal configuration set, where the reference signal configuration is used to indicate position information of resource elements (REs) that are used to send reference signals on antenna ports in an antenna port set; and the reference signal configuration set includes at least one first reference signal configuration, and an antenna port set corresponding to the first reference signal configuration includes at least two antenna port subsets, where a resource element (RE) that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair; and a determining unit 52, configured to determine, according to the reference signal configuration indicated by the reference signal configuration sent by the sending unit 51, positions of the resource elements (REs) that are used to send reference signals on the antenna ports in the antenna port set corresponding to the reference signal configuration, where: the sending unit 51 is further configured to send the reference signals to the user equipment at the positions determined by the determining unit 52.

The first RB pair and the second RB pair are separately located at different frequency domain positions in a same subframe or located in a same subband of different subframes.

A resource element group (REG) used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A = \{REG_i | i=0, 1, \ldots, M-1\}$, $M \geq 2$, where an intersection of different resource element groups in the set A is an empty set, $i_1, i_2 \in \{0, \ldots, M-1\}$, and $i_1$ and $i_2$ are indexes of the resource element groups (REGs) used in the two RB pairs respectively; and each resource element group in the set A represents a set of position triplets (k',l', n$_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, n$_s$ represents an index of a timeslot to which the resource element belongs, mod represents a modulo operation, and n$_s$ mod 2 represents a computed value resulting from a modulo 2 operation on n$_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, $j_1 \neq j_2$, $j_1, j_2 \in \{0,1, \ldots, M-1\}$, and $i_1$, $i_2$, $j_1$ and $j_2$ meet at least one of the following relationships: $j_1 = (i_1+n)$ mod M, $j_2 = (i_2+n)$ mod M, and $j_1 = i_2$, $j_2 = i_1$, where n represents a shift whose value is an integer.

Specifically, different resource element groups in the set A may be different position sets of REs that are used to send CSI RSs on eight antenna ports in an LTE R10 system. In this case, the resource element groups used by the two antenna port subsets in the two RB pairs do not have an intersection. In this case, for how an eNB instructs legacy UE and UE in an LTE R12 system or in a future system to receive a CSI RS and how the UE performs correct rate matching, so that in the reference signal configuration, an RE position occupied by a CSI RS in the LTE R10 system may be reused and interference to legacy UE in a same cell may be reduced, refer to the descriptions in step 102 in the foregoing embodiment, and details are not further described herein.

In addition, in a two-cell example, for how to instruct, in two cells, UE to use a reference signal configuration to receive CSI RSs, so as to effectively avoid pilot contamination and interference to a PDSCH caused by a CSI RS of a neighboring cell, refer to the descriptions in step 102 in the foregoing embodiment, and details are not further described herein.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (1) to (5), where the resource element group set A or the resource element group applies to a subframe type FS1 or FS2.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (25) to (27), where the resource element group set A may apply to a subframe type FS2.

For LTE special subframe configurations 1, 2, 6, and 7, that each resource element group includes eight REs is used as an example. The resource element group set A may further include two or more of the resource element groups represented by the expressions (34) to (36).

For LTE special subframe configurations 3, 4, 8, and 9, that each resource element group includes eight REs is used as an example. The resource element group set A may further include two or more of the resource element groups represented by the expressions (43) to (45).

Optionally, for the normal CP, a resource element group used in the reference signal configuration and a reference signal configuration set may be shown in Table 1, Table 2, or Table 3 in the foregoing embodiment. For related descriptions, refer to the foregoing embodiment, and details are not further described herein.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (52) to (55), where the resource element group set or the resource element group applies to a subframe type FS1 or FS2.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by the expressions (64) to (66), where the resource element group set or the resource element group may apply to a subframe type FS2.

Optionally, for the extended CP, a resource element group used in the reference signal configuration and a reference signal configuration set may be shown in Table 4, Table 5, Table 6, or Table 7 in the foregoing embodiment. For related descriptions, refer to the foregoing embodiment, and details are not further described herein.

Compared with the prior art, in this embodiment, a base station 50 sends reference signal resource configuration information to user equipment, where the reference signal resource configuration information includes antenna port quantity information and a resource configuration index, and resource elements (REs) that are used to send reference signals on antenna ports in two antenna port subsets included in an antenna port set corresponding to a reference signal configuration indicated by the reference signal resource configuration information are located in two different resource block (RB) pairs; and the base station 50 determines, according to the sent reference signal resource configuration information, positions of the resource elements (REs) that are used to send reference signals on the antenna ports in the antenna port set, and sends reference signals to the user equipment at the positions of the resource elements (RE). Therefore, a problem that prior-art reference signals do not support more than eight antenna ports can be resolved, and a feasible design solution for reference signal configuration is provided for an antenna configuration including more than eight antenna ports. In addition, resource element groups used by the two antenna port subsets in the two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement, and improving a system throughput.

Figure 8:
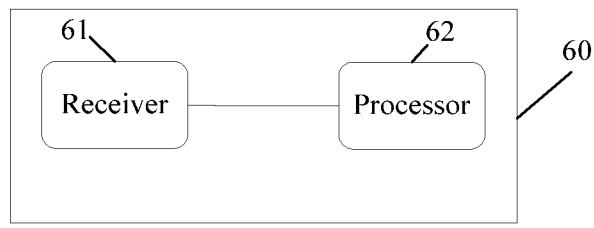
FIG. 8 is a schematic structural diagram of user equipment according to another embodiment.

Another embodiment provides user equipment 60. As shown in FIG. 8, the user equipment 60 includes: a receiver 61, configured to receive reference signal resource configuration information sent by a base station, where the reference signal resource configuration information includes antenna port quantity information and a resource configuration index; and a processor 62, configured to determine a reference signal configuration from a reference signal configuration set according to the received antenna port quantity information and resource configuration index, where the reference signal configuration is used to indicate position information of resource elements (REs) that are used to send reference signals on antenna ports in an antenna port set. The reference signal configuration set includes at least one first reference signal configuration, and an antenna port set corresponding to the first reference signal configuration includes at least two antenna port subsets, where an RE that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair; and configured to obtain, according to the determined reference signal configuration, positions of the resource elements (REs) that are used to send reference signals on the antenna ports in the antenna port set. The receiver 61 is further configured to receive the reference signals according to the positions of the REs.

The first RB pair and the second RB pair are separately located at different frequency domain positions in a same subframe or located in a same subband of different subframes.

A resource element group used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is A={$REG_i$|i=0, 1, . . . , M−1}; M≥2, where an intersection of different resource element groups in the set A is an empty set, $i_1, i_2 \in \{0, \ldots, M-1\}$, $M \geq 2$, and $i_1$ and $i_2$ are indexes of the resource element groups (REGs) used in the two RB pairs respectively; and each resource element group in the set A represents a set of position triplets (k', l', $n_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s$ mod 2 represents a computed value resulting from a modulo 2 operation on $n_s$.

The reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, and $j_1 \neq j_2$, $j_1, j_2 \in \{0,1,\ldots,M-1\}$, where: $i_1$, $i_2$, $j_1$ and $j_2$ meet at least one of the following relationships: $j_1 = (i_1+n) \bmod M$, $j_2 = (i_2+n) \bmod M$, and $j_1 = i_2$, $j_2 = i_1$, where n represents a shift whose value is an integer.

Specifically, different resource element groups in the set A may be different position sets of REs that are used to send CSI RSs on eight antenna ports in an LTE R10 system. In this case, the resource element groups used by the two antenna port subsets in the two RB pairs do not have an intersection. In this case, for how an eNB instructs legacy UE and UE in an LTE R12 system or in a future system to receive a CSI RS and how the UE performs correct rate matching, so that in the reference signal configuration, an RE position occupied by a CSI RS in the LTE R10 system may be reused and interference to legacy UE in a same cell may be reduced, refer to the descriptions in step 102 in the foregoing embodiment, and details are not further described herein.

In addition, in a two-cell example, for how to instruct, in two cells, UE to use a reference signal configuration to receive CSI RSs, so as to effectively avoid pilot contamination and interference to a PDSCH caused by a CSI RS of a neighboring cell, refer to the descriptions in step 102 in the foregoing embodiment, and details are not further described herein.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (1) to (5), where the resource element group set A or the resource element group may apply to a subframe type FS1 or FS2.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (25) to (27), where the resource element group set A may apply to a subframe type FS2.

For LTE special subframe configurations 1, 2, 6, and 7, that each resource element group includes eight REs is used as an example. The resource element group set A may further include two or more of the resource element groups represented by (34) to (36).

For LTE special subframe configurations 3, 4, 8, and 9, that each resource element group includes eight REs is used as an example. The resource element group set A may further include two or more of the resource element groups represented by (43) to (45).

Optionally, for the normal CP, a resource element group used in the reference signal configuration and a reference signal configuration set may be shown in Table 1, Table 2, or Table 3 in the foregoing embodiment. For related descriptions, refer to the foregoing embodiment, and details are not further described herein.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (52) to (55), where the resource element group set or the resource element group may apply to a subframe type FS1 or FS2.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (64) to (66), where the resource element group set or the resource element group may apply to a subframe type FS2.

Optionally, for the extended CP, a resource element group used in the reference signal configuration and a reference signal configuration set may be shown in Table 4, Table 5, Table 6, or Table 7 in the foregoing embodiment. For related descriptions, refer to the foregoing embodiment, and details are not further described herein.

Compared with the prior art, in this embodiment, user equipment 60 receives reference signal resource configuration information sent by a base station, where the reference signal resource configuration information includes antenna port quantity information and a resource configuration index; the user equipment 60 determines a reference signal configuration from a reference signal configuration set according to the received antenna port quantity information and resource configuration index, where REs that are used to send reference signals on antenna ports in two antenna port subsets included in an antenna port set corresponding to the reference signal configuration are located in two different resource block (RB) pairs; and the user equipment 60 obtains, according to the determined reference signal configuration, positions of the resource elements (REs) that are used to send reference signals on the antenna ports in the antenna port set, and receives, according to the positions of the REs, the reference signals sent by the base station. Therefore, a problem that prior-art reference signals do not support more than eight antenna ports can be resolved, and a feasible design solution for reference signal configuration is provided for an antenna configuration including more than eight antenna ports. In addition, resource element groups used by the two antenna port subsets in the two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement and improving a system throughput.

Figure 9:
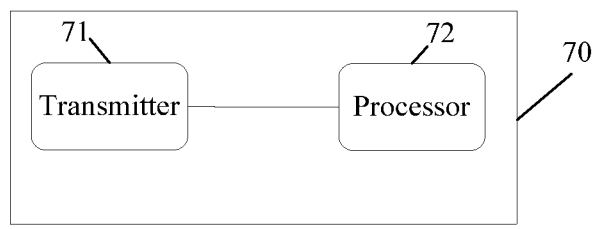
FIG. 9 is a schematic structural diagram of a base station according to another embodiment.

Another embodiment provides a base station 70. As shown in FIG. 9, the base station 70 includes: a transmitter 71, configured to send reference signal resource configuration information to user equipment, where the reference signal resource configuration information includes antenna port quantity information and a resource configuration index, and the antenna port quantity information and the resource configuration index are used to indicate a reference signal configuration in a reference signal configuration set, where the reference signal configuration is used to indicate position information of resource elements (REs) that are used to send reference signals on antenna ports in an antenna port set; and the reference signal configuration set includes at least one first reference signal configuration, and an antenna port set corresponding to the first reference signal configuration includes at least two antenna port subsets, where a resource element (RE) that is used to send a reference signal on an antenna port in a first antenna port subset is located in a first resource block (RB) pair, an RE that is used to send a reference signal on an antenna port in a second antenna port subset is located in a second RB pair, and the first RB pair is different from the second RB pair. The base station also includes a processor 72, configured to determine, according to the reference signal configuration indicated by the sent reference signal resource configuration information, positions of the resource elements (REs) that are used to send reference signals on the antenna ports in the antenna port set corresponding to the reference signal configuration. The transmitter 71 is further configured to send the reference signals to the user equipment at the positions determined by the processor 72.

The first RB pair and the second RB pair are separately located at different frequency domain positions in a same subframe or located in a same subband of different subframes.

A resource element group used by the first antenna port subset in the first RB pair is $REG_{i_1}$, and a resource element group used by the second antenna port subset in the second RB pair is $REG_{i_2}$, where $REG_{i_1} \in A$, $REG_{i_2} \in A$, and $i_1 \neq i_2$; the set is $A=\{REG_i | i=0, 1, \ldots, M-1\}$, $M \geq 2$, where an intersection of different resource element groups in the set A is an empty set, $i_1, i_2 \in \{0, \ldots, M-1\}$, $M \geq 2$, $i_1$ and $i_2$ are indexes of the resource element groups (REGs) used in the two RB pairs respectively; and each resource element group in the set A represents a set of position triplets (k',l', $n_s$ mod 2) of resource elements (REs) in an RB pair that are used to send reference signals, relative to the RB pair in which the resource elements (REs) are located, where k' represents an index of a subcarrier of the resource element (RE), in the RB pair in which the resource element (RE) is located, l' represents an index of an orthogonal frequency division multiplexing (OFDM) symbol of the resource element, in the RB pair in which the resource element is located, $n_s$ represents an index of a timeslot to which the resource element belongs, mod represents a modulo operation, and $n_s$ mod 2 represents a computed value resulting from a modulo 2 operation on $n_s$.

Further, the reference signal configuration set includes at least one second reference signal configuration, an antenna port set corresponding to the second reference signal configuration includes at least the first antenna port subset and the second antenna port subset, a resource element group used by the first antenna port subset in the first RB pair is $REG_{j_1}$, and a resource element group used by the second antenna port subset in the second RB pair is $REG_{j_2}$, where $REG_{j_1} \in A$, $REG_{j_2} \in A$, and $j_1 \neq j_2$, $j_1, j_2 \in \{0, 1, \ldots, M-1\}$, where: $i_1, i_2, j_1$ and $j_2$ meet at least one of the following relationships: $j_1=(i_1+n) \bmod M$, $j_2=(i_2+n) \bmod M$, and $j_1=i_2$, $j_2=i_1$, where n represents a shift whose value is an integer.

Specifically, different resource element groups in the set A may be different position sets of REs that are used to send CSI RSs on eight antenna ports in an LTE R10 system. In this case, the resource element groups used by the two antenna port subsets in the two RB pairs do not have an intersection. In this case, for how an eNB instructs legacy UE and UE in an LTE R12 system or in a future system to receive a CSI RS and how the UE performs correct rate matching, so that in the reference signal configuration, an RE position occupied by a CSI RS in the LTE R10 system may be reused and interference to legacy UE in a same cell may be reduced, refer to the descriptions in step 102 in the foregoing embodiment, and details are not further described herein.

In addition, in a two-cell example, for how to instruct, in two cells, UE to use a reference signal configuration to receive CSI RSs, so as to effectively avoid pilot contamination and interference to a PDSCH caused by a CSI RS of a neighboring cell, refer to the descriptions in step 102 in the foregoing embodiment, and details are not further described herein.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (1) to (5), where the resource element group set A or the resource element group may apply to a subframe type FS1 or FS2.

Optionally, when a cyclic prefix (CP) is a normal CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (25) to (27), where the resource element group set A may apply to a subframe type FS2.

For LTE special subframe configurations 1, 2, 6, and 7, that each resource element group includes eight REs is used as an example. The resource element group set A may further include two or more of the resource element groups represented by (34) to (36).

For LTE special subframe configurations 3, 4, 8, and 9, that each resource element group includes eight REs is used as an example. The resource element group set A may further include two or more of the resource element groups represented by (43) to (45).

Optionally, for the normal CP, a resource element group used in the reference signal configuration and a reference signal configuration set may be shown in Table 1, Table 2, or Table 3 in the foregoing embodiment. For related descriptions, refer to the foregoing embodiment, and details are not further described herein.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (52) to (55), where the resource element group set or the resource element group may apply to a subframe type FS1 or FS2.

Optionally, when a cyclic prefix (CP) is an extended CP, a position of a resource element (RE) relative to an RB pair in which the resource element (RE) is located is represented by a triplet (k',l',$n_s$ mod 2) That each resource element group includes eight REs is used as an example. The resource element group set A includes two or more of the resource element groups represented by (64) to (66), where the resource element group set or the resource element group may apply to a subframe type FS2.

Optionally, for the extended CP, a resource element group used in the reference signal configuration and a reference signal configuration set may be shown in Table 4, Table 5, Table 6, or Table 7 in the foregoing embodiment. For related descriptions, refer to the foregoing embodiment, and details are not further described herein.

Compared with the prior art, in this embodiment, a base station 70 sends reference signal resource configuration information to user equipment, where the reference signal resource configuration information includes antenna port quantity information and a resource configuration index, and resource elements (REs) that are used to send reference signals on antenna ports in two antenna port subsets included in an antenna port set corresponding to a reference signal configuration indicated by the reference signal resource configuration information are located in two different resource block (RB) pairs; and the base station 70 determines, according to the sent reference signal resource configuration information, positions of the resource elements (REs) that are used to send reference signals on the antenna ports in the antenna port set, and sends reference signals to the user equipment at the positions of the resource elements (RE). Therefore, a problem that prior-art reference signals do not support more than eight antenna ports can be resolved, and a feasible design solution for reference signal configuration is provided for an antenna configuration including more than eight antenna ports. In addition, resource element groups used by the two antenna port subsets in the two RB pairs do not have an intersection. Therefore, on one hand, an RE position occupied by a CSI RS in a legacy system may be reused and interference to legacy UE in a same cell may be reduced. On the other hand, for multiple different reference signal configurations, because the resource element groups used in the two RB pairs do not have an intersection, inter-cell interference caused by reference signals may be reduced, that is, pilot contamination is reduced, thereby improving efficiency of channel state information measurement and improving a system throughput.

The reference signal transmission apparatus provided in the embodiments may implement the foregoing provided method embodiments; for specific function implementation, refer to the descriptions in the method embodiments, and details are not described herein again. The reference signal transmission method and an apparatus provided in the embodiments may be applicable to sending of reference signals in an LTE system, but is not limited thereto.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include a magnetic disk, an optical disc, a read-only memory (ROM), or a random access memory (RAM).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving reference signal resource configuration information from a base station, wherein the reference signal resource configuration information comprises a resource configuration index;
   determining a first reference signal configuration from a reference signal configuration set according to the resource configuration index, wherein the first reference signal configuration indicates position information of resource elements (REs) that are used to send reference signals on antenna ports in a first antenna port set, wherein the first antenna port set comprises at least two antenna port subsets, wherein a respective resource element group used by each antenna port subset consists of four REs that are adjacent in frequency domain and in time domain, and reference signals on different antenna ports in each antenna port subset are code division multiplexed over the respective resource element group used by the corresponding antenna port subset; and
   receiving the reference signals according to the first reference signal configuration.

2. The method according to claim 1, wherein each antenna port subset consists of four antenna ports, and code division multiplexing (CDM) codes for the reference signals sent on the four antenna ports are [1,1,1,1], [1,−1,1,−1], [1,1,−1,−1], and [1,−1,−1,1] respectively.

3. The method according to claim 1, wherein resource element groups ($REG_{i_1}$,$REG_{i_2}$) used by two antenna port subsets in the first reference signal configuration are ($REG_0^{NCP}$,$REG_1^{NCP}$),($REG_1^{NCP}$,$REG_2^{NCP}$),($REG_2^{NCP}$,$REG_3^{NCP}$),($REG_3^{NCP}$,$REG_4^{NCP}$),($REG_4^{NCP}$,$REG_0^{NCP}$), ($REG_0^{NCP}$,$REG_4^{NCP}$),($REG_1^{NCP}$,$REG_3^{NCP}$),($REG_2^{NCP}$,$REG_1^{NCP}$),($REG_3^{NCP}$,$REG_2^{NCP}$), or ($REG_3^{NCP}$,$REG_1^{NCP}$), and wherein NCP indicates normal cyclic prefix.

4. An apparatus, comprising:
   at least one processor; and
   a non-transitory storage medium coupled to the at least one processor and storing programming instructions that are executable by the at least one processor, wherein execution of the programming instructions enables the apparatus to:
   receive reference signal resource configuration information from a base station, wherein the reference signal resource configuration information comprises a resource configuration index;

determine a first reference signal configuration from a reference signal configuration set according to the resource configuration index, wherein the first reference signal configuration indicates position information of resource elements (REs) that are used to send reference signals on antenna ports in a first antenna port set, wherein the first antenna port set comprises at least two antenna port subsets, wherein a respective resource element group used by each antenna port subset consists of four REs that are adjacent in frequency domain and in time domain, and reference signals on different antenna ports in each antenna port subset are code division multiplexed over the respective resource element group used by the corresponding antenna port subset; and receive the reference signals according to the first reference signal configuration.

5. The apparatus according to claim 4, wherein each antenna port subset consists of four antenna ports, and code division multiplexing (CDM) codes for the reference signals on the four antenna ports are [1,1,1,1], [1,−1,1,−1], [1,1,−1,−1], and [1,−1,−1,1] respectively.

6. The apparatus according to claim 4, wherein resource element groups $(REG_{i_1}, REG_{i_2})$ used by two antenna port subsets in the first reference signal configuration are $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, $(REG_4^{NCP}, REG_0^{NCP})$, $(REG_0^{NCP}, REG_2^{NCP})$, $(REG_1^{NCP}, REG_3^{NCP})$, $(REG_2^{NCP}, REG_4^{NCP})$, $(REG_1^{NCP}, REG_3^{NCP})$, $(REG_3^{NCP}, REG_2^{NCP})$, or $(REG_3^{NCP}, REG_1^{NCP})$ $(REG_3^{NCP}, REG_1^{NCP})$, and wherein NCP indicates normal cyclic prefix.

7. A non-transitory computer-readable storage medium comprising instructions which, when executed by a computer, cause the computer to carry out steps of:

receiving reference signal resource configuration information from a base station, wherein the reference signal resource configuration information comprises a resource configuration index;

determining a first reference signal configuration from a reference signal configuration set according to the resource configuration index, wherein the first reference signal configuration indicates position information of resource elements (REs) that are used to send reference signals on antenna ports in a first antenna port set, wherein the first antenna port set comprises at least two antenna port subsets, wherein a respective resource element group used by each antenna port subset consists of four REs that are adjacent in the frequency domain and in the time domain, and reference signals on different antenna ports in each antenna port subset are code division multiplexed over the respective resource element group used by the corresponding antenna port subset; and receiving the reference signals according to the first reference signal configuration.

8. The non-transitory computer-readable storage medium according to claim 7, wherein each antenna port subset consists of four antenna ports, and code division multiplexing (CDM) codes for the reference signals sent on the four antenna ports are [1,1,1,1], [1,−1,1,−1], [1,1,−1,−1], and [1,−1,−1,1] respectively.

9. The non-transitory computer-readable storage medium according to claim 7, wherein resource element groups $(REG_{i_1}, REG_{i_2})$ used by two antenna port subsets in the first reference signal configuration are $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, $(REG_4^{NCP}, REG_0^{NCP})$, $(REG_0^{NCP}, REG_4^{NCP})$, $(REG_1^{NCP}, REG_3^{NCP})$, $(REG_2^{NCP}, REG_1^{NCP})$, $(REG_3^{NCP}, REG_2^{NCP})$, or $(REG_3^{NCP}, REG_1^{NCP})$, and wherein NCP indicates a normal cyclic prefix.

10. A method, comprising:

sending reference signal resource configuration information to a user apparatus, wherein the reference signal resource configuration information comprises a resource configuration index, and the resource configuration index indicates a first reference signal configuration in a reference signal configuration set, wherein the first reference signal configuration indicates position information of resource elements (REs) that will be used to send reference signals on antenna ports in a first antenna port set, wherein the first antenna port set comprises at least two antenna port subsets, wherein a respective resource element group used by each antenna port subset consists of four REs that are adjacent in frequency domain and in time domain; and sending reference signals corresponding to the first reference signal configuration, wherein reference signals on different antenna ports in each antenna port subset are code division multiplexed over the respective resource element group corresponding to the respective antenna port subset.

11. The method according to claim 10, wherein each antenna port subset of the at least two antenna port subsets consists of four antenna ports, and code division multiplexing (CDM) codes for reference signals sent on the four antenna ports are [1,1,1,1], [1,−1,1,−1], [1,1,−1,−1], and [1,−1,−1,1] respectively.

12. The method according to claim 10, wherein resource element groups $(REG_{i_1}, REG_{i_2})$ used by two antenna port subsets in the first reference signal configuration are $(REG_0^{NCP}, REG_1^{NCP})$, $(REG_1^{NCP}, REG_2^{NCP})$, $(REG_2^{NCP}, REG_3^{NCP})$, $(REG_3^{NCP}, REG_4^{NCP})$, $(REG_4^{NCP}, REG_0^{NCP})$, $(REG_0^{NCP}, REG_4^{NCP})$, $(REG_1^{NCP}, REG_3^{NCP})$, $(REG_2^{NCP}, REG_1^{NCP})$, $(REG_3^{NCP}, REG_2^{NCP})$, or $(REG_3^{NCP}, REG_1^{NCP})$, and wherein NCP indicates a normal cyclic prefix.

13. An apparatus, comprising:

at least one processor; and a non-transitory storage medium coupled to the at least one processor and storing programming instructions that are executable by the at least one processor, wherein execution of the programming instructions enables the apparatus to:

send reference signal resource configuration information to a user apparatus, wherein the reference signal resource configuration information comprises a resource configuration index, and the resource configuration index indicates a first reference signal configuration in a reference signal configuration set, wherein the first reference signal configuration indicates position information of resource elements (REs) that will be used to send reference signals on antenna ports in a first antenna port set, wherein the first antenna port set comprises at least two antenna port subsets, wherein a respective resource element group used by each antenna port subset consists of four REs that are adjacent in frequency domain and in time domain; and send reference signals corresponding to the first reference signal configuration, wherein reference signals on different antenna ports in each antenna port subset are code division multiplexed over the respective resource element group corresponding to the respective antenna port subset.

14. The apparatus according to claim 13, wherein each antenna port subset of the at least two antenna port subsets consists of four antenna ports, and code division multiplexing (CDM) codes for the reference signals sent on the four antenna ports are [1,1,1,1], [1,−1,1,−1], [1,1,−1,−1], and [1,−1,−1,1] respectively.

15. The apparatus according to claim 14, wherein resource element groups ($REG_{i_1}$, $REG_{i_2}$) used by two antenna port subsets in the first reference signal configuration are ($REG_0^{NCP}$, $REG_1^{NCP}$), ($REG_1^{NCP}$, $REG_2^{NCP}$), ($REG_2^{NCP}$, $REG_3^{NCP}$), ($REG_3^{NCP}$, $REG_4^{NCP}$), ($REG_4^{NCP}$, $REG_0^{NCP}$), ($REG_0^{NCP}$, $REG_4^{NCP}$), ($REG_1^{NCP}$, $REG_3^{NCP}$), ($REG_2^{NCP}$, $REG_1^{NCP}$), ($REG_3^{NCP}$, $REG_2^{NCP}$), or ($REG_3^{NCP}$, $REG_1^{NCP}$), and wherein NCP indicates a normal cyclic prefix.

16. A non-transitory computer-readable storage medium comprising instructions which, when executed by a computer, cause the computer to:
send reference signal resource configuration information to a user apparatus, wherein the reference signal resource configuration information comprises a resource configuration index, and the resource configuration index indicates a first reference signal configuration in a reference signal configuration set, wherein the first reference signal configuration indicates position information of resource elements (REs) that will be used to send reference signals on antenna ports in a first antenna port set, wherein the first antenna port set comprises at least two antenna port subsets, wherein a respective resource element group used by each antenna port subset consists of four REs that are adjacent in frequency domain and in time domain; and
send reference signals corresponding to the first reference signal configuration, wherein reference signals on different antenna ports in each antenna port subset are code division multiplexed over the respective resource element group corresponding to the respective antenna port subset.

17. The non-transitory computer-readable storage medium according to claim 16, wherein each antenna port subset of the at least two antenna port subsets consists of four antenna ports, and code division multiplexing (CDM) codes for the reference signals sent on the four antenna ports are [1,1,1,1], [1,−1,1,−1], [1,1,−1,−1], and [1,−1,−1,1] respectively.

18. The non-transitory computer-readable storage medium according to claim 16, wherein resource element groups ($REG_{i_1}$, $REG_{i_2}$) used by two antenna port subsets in the first reference signal configuration are ($REG_0^{NCP}$, $REG_1^{NCP}$), ($REG_1^{NCP}$, $REG_2^{NCP}$), ($REG_2^{NCP}$, $REG_3^{NCP}$), ($REG_3^{NCP}$, $REG_4^{NCP}$), ($REG_4^{NCP}$, $REG_0^{NCP}$), ($REG_0^{NCP}$, $REG_4^{NCP}$), ($REG_1^{NCP}$, $REG_3^{NCP}$), ($REG_2^{NCP}$, $REG_1^{NCP}$), ($REG_3^{NCP}$, $REG_2^{NCP}$), or ($REG_3^{NCP}$, $REG_1^{NCP}$), and wherein NCP indicates a normal cyclic prefix.

19. The method according to claim 1, wherein the four REs occupy first and second symbols that are adjacent in time domain, wherein two of the four REs occupy first and second subcarriers that are adjacent in the frequency domain in the first symbol, the other two of the four REs occupy the first and second subcarriers in the second symbol.

20. The apparatus according to claim 4, wherein the four REs occupy first and second symbols that are adjacent in time domain, wherein two of the four REs occupy first and second subcarriers that are adjacent in the frequency domain in the first symbol, the other two of the four REs occupy the first and second subcarriers in the second symbol.

21. The non-transitory computer-readable storage medium according to claim 7, wherein the four REs occupy first and second symbols that are adjacent in time domain, wherein two of the four REs occupy first and second subcarriers that are adjacent in the frequency domain in the first symbol, the other two of the four REs occupy the first and second subcarriers in the second symbol.

22. The method according to claim 10, wherein the four REs occupy first and second symbols that are adjacent in time domain, wherein two of the four REs occupy first and second subcarriers that are adjacent in the frequency domain in the first symbol, the other two of the four REs occupy the first and second subcarriers in the second symbol.

23. The apparatus according to claim 13, wherein the four REs occupy first and second symbols that are adjacent in time domain, wherein two of the four REs occupy first and second subcarriers that are adjacent in the frequency domain in the first symbol, the other two of the four REs occupy the first and second subcarriers in the second symbol.

24. The non-transitory computer-readable storage medium according to claim 16, wherein the four REs occupy first and second symbols that are adjacent in time domain, wherein two of the four REs occupy first and second subcarriers that are adjacent in the frequency domain in the first symbol, the other two of the four REs occupy the first and second subcarriers in the second symbol.

* * * * *

UNITED STATES PATENT AND TRADEMARK OFFICE
CERTIFICATE OF CORRECTION

PATENT NO. : 11,496,269 B2  
APPLICATION NO. : 17/096703  
DATED : November 8, 2022  
INVENTOR(S) : Jianguo Wang et al.

Page 1 of 1

It is certified that error appears in the above-identified patent and that said Letters Patent is hereby corrected as shown below:

In the Specification

In the Detailed Description of Illustrative Embodiments, Column 33, Line 21; delete "c0" and insert --c20--.

In the Detailed Description of Illustrative Embodiments, Column 34, Line 65; delete "c2" and insert --c20--.

In the Detailed Description of Illustrative Embodiments, Column 35, Line 2; delete "c2" and insert --c21--.

In the Detailed Description of Illustrative Embodiments, Column 35, Line 66; delete "c6 to c8" and insert --c16 to c18--.

In the Detailed Description of Illustrative Embodiments, Column 36, Line 2; delete "c6 to c8" and insert --c16 to c18--.

In the Claims

Claim 2, Column 52, Line 48; delete "sent".

Claim 6, Column 53, Line 32; insert --a-- between "indicates" and "normal".

Claim 8, Column 53, Line 61; delete "sent".

Signed and Sealed this  
Twenty-seventh Day of December, 2022

Katherine Kelly Vidal  
*Director of the United States Patent and Trademark Office*